(12) United States Patent
Pihlaja et al.

(10) Patent No.: US 7,778,797 B2
(45) Date of Patent: Aug. 17, 2010

(54) METHOD AND SYSTEM FOR DETECTING ABNORMAL OPERATION IN A STIRRED VESSEL

(75) Inventors: Roger K. Pihlaja, Spring Park, MN (US); John P. Miller, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 253 days.

(21) Appl. No.: 11/863,172

(22) Filed: Sep. 27, 2007

(65) Prior Publication Data

US 2008/0082294 A1 Apr. 3, 2008

Related U.S. Application Data

(60) Provisional application No. 60/847,798, filed on Sep. 28, 2006.

(51) Int. Cl.
*G01F 19/00* (2006.01)
(52) U.S. Cl. ..................... 702/179; 714/742
(58) Field of Classification Search ............. 702/179, 702/181–186, 188; 700/1; 709/236; 370/469; 714/742
See application file for complete search history.

(56) References Cited

U.S. PATENT DOCUMENTS

| | | | |
|---|---|---|---|
| 5,471,880 A | 12/1995 | Lang et al. | |
| 5,960,214 A | 9/1999 | Sharpe, Jr. et al. | |
| 6,017,143 A | 1/2000 | Eryurek et al. | |
| 6,212,483 B1 * | 4/2001 | Carew et al. | 702/183 |
| 6,299,410 B1 * | 10/2001 | Hilbert et al. | 416/145 |
| 6,615,090 B1 | 9/2003 | Blevins et al. | |
| 7,079,984 B2 | 7/2006 | Eryurek et al. | |
| 7,085,610 B2 | 8/2006 | Eryurek et al. | |
| 7,181,654 B2 | 2/2007 | Ford, Jr. et al. | |
| 2006/0064182 A1 | 3/2006 | Ford, Jr. et al. | |
| 2007/0089011 A1 * | 4/2007 | Dodeja et al. | 714/742 |

OTHER PUBLICATIONS

International Search Report and Written Opinion of the International Searching Authority for International Application No. PCT/US2007/079918 dated Mar. 12, 2008.
Written Opinion of the International Searching Authority for International Application No. PCT/US2007/079918 dated Mar. 31, 2009.

* cited by examiner

*Primary Examiner*—Edward Raymond
(74) *Attorney, Agent, or Firm*—Marshall, Gerstein & Borun LLP

(57) ABSTRACT

A system and method for detecting abnormal situations associated with a stirred vessel in a process plant receives statistical data associated with a pressure within a stirred vessel. A pressure signal associated with the pressure in the vessel is filtered by a digital filter to isolate a frequency component corresponding to pressure changes caused by the movement of a blade of an agitator through a fluid. For example, a pressure sensor device disposed at least partially within the stirred vessel may generate the statistical data based on a pressure signal. The statistical data is analyzed to detect whether one or more abnormal situations associated with an agitator of the stirred vessel exist. For example, the statistical data may be analyzed to detect whether the agitator is broken/unbalanced, corroded, missing a blade or multiple blades, etc. If an abnormal situation is detected, an indicator of the abnormal situation may be generated.

24 Claims, 16 Drawing Sheets

METHOD AND SYSTEM FOR DETECTING ABNORMAL OPERATION IN A STIRRED VESSEL

CROSS-REFERENCES TO RELATED APPLICATIONS

This application claims priority from U.S. Provisional Application Ser. No. 60/847,798 which was filed on Sep. 28, 2006, entitled "METHOD FOR DETECTING LOSS OF AGITATION IN A STIRRED VESSEL." The above-referenced provisional patent application is hereby incorporated by reference herein, in its entirety.

TECHNICAL FIELD

This disclosure relates generally to process control systems and, more particularly, to systems for monitoring and/or detecting abnormal condition in a stirred vessel.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamps) signals to and from the process controller via an analog bus or analog lines. These 4 to 20 mA signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self calibration, identification, diagnostics, etc. A number of standard and open smart device communication protocols such as the HART®, PROFIBUS®, WORLDFIP®, Device Net®, and CAN protocols, have been developed to enable smart field devices made by different manufacturers to be used together within the same process control network. Moreover, the all digital, two wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-integral-derivative (PID) control routine. The different function blocks within a process control system are configured to communicate with each other (e.g., over a bus) to form one or more process control loops, the individual operations of which are spread throughout the process and are, thus, decentralized.

Information from the field devices and the process controllers is typically made available to one or more other hardware devices such as operator workstations, maintenance workstations, personal computers, handheld devices, data historians, report generators, centralized databases, etc., to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as Object Linking and Embedding (OLE) for Process Control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the AMS™ Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, the Machinery Health® application provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, now U.S. Pat. No. 7,085,610, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then be sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Stirred vessels, such as stirred tanks of a reactor, are commonly used in the chemical and pharmaceutical industries. Typically, a stirred vessel of a reactor includes an agitator to mix various substances together. With some processes, the mixing causes an exothermic reaction. The rate at which the substances are added to the reactor is based, at least partially, on a cooling capacity of the reactor because, if the reactor becomes too hot, an explosion could occur or the quality and/or quantity of the output of the reactor could be reduced. If the agitator unexpectedly stops working, ingredients of the process may settle into layers of unreacted material within the stirred vessel. If the agitator is then restarted, a large amount of the ingredients could suddenly react causing an explosion.

One technique to monitor whether the agitator is working involves monitoring a motor that drives the agitator. For example, if the motor is running, it may be assumed that the agitator is working. There are situations, however, in which the agitator stops working but the motor continues running. For example, a shaft of the agitator may break off from the motor. As another example, a coupling mechanism between the motor and the shaft may fail. Additionally, if an agitator fails, it may cause damage to the reactor. For instance, some stirred vessels are glass-lined. When a blade (also referred to as a paddle) of an agitator falls off, for example, it may render an expensive glass-lined stirred vessel unusable. Predicting such a failure, however, is difficult using existing techniques.

Another technique, utilizes statistical data associated with pressure within a stirred vessel. A pressure sensor device disposed at least partially within the stirred vessel may generate the statistical data based on a pressure signal. The statistical data is analyzed to detect whether one or more abnormal situations associated with an agitator of the stirred vessel exist. The statistical data may be analyzed to detect whether the agitator is no longer turning, is turning at a rate that is different than expected, is out of balance, is broken, etc. If an abnormal situation is detected, an indicator of the abnormal situation may be generated. This technique is disclosed in U.S. Pat. No. 7,181,654 entitled "System and Method for Detecting an Abnormal Situation Associated with a Reactor." The entire disclosure of this patent is hereby incorporated by reference herein.

SUMMARY

A system and method for detecting abnormal situations associated with a stirred vessel in a process plant receives statistical data associated with pressure within a stirred vessel. A pressure signal associated with the pressure in the vessel is filtered by a digital filter to isolate a frequency component corresponding to pressure changes caused by a blade of an agitator. For example, a pressure sensor device disposed at least partially within the stirred vessel may generate the statistical data based on a pressure signal. The statistical data is analyzed to detect whether one or more abnormal situations associated with an agitator of the stirred vessel exist. For example, the statistical data may be analyzed to detect whether the agitator is broken/unbalanced, corroded, missing a blade or multiple blades, etc. If an abnormal situation is detected, an indicator of the abnormal situation may be generated.

In one embodiment, a method for detecting an abnormal situation associated with a stirred vessel in a process plant is disclosed. The method may include collecting first data associated with pressure within the stirred vessel, filtering the collected first data to isolate a frequency component corresponding to changes in pressure associated with blade rotation in the vessel, generating statistical data from the filtered first data, analyzing the statistical data to detect whether one or more abnormal situations associated with an agitator of the stirred vessel exist, and generating an indicator of an abnormal situation if one or more of the one or more abnormal situations are detected.

In another embodiment, a method for detecting an abnormal situation associated with a stirred vessel in a process plant is disclosed. The method may include collecting first data associated with pressure within a stirred vessel, filtering the collected first data to isolate a frequency component corresponding to changes in pressure associated with blade rotation in the vessel, generating first statistical data from the filtered first data, generating second statistical data from the collected first data, analyzing the first statistical data and the second statistical data to detect whether one or more abnormal situations associated with an agitator of the stirred vessel exist, and generating an indicator of an abnormal situation if one or more of the one or more abnormal situations are detected.

In a further embodiment, a system for detecting an abnormal situation associated with a stirred vessel in a process plant is disclosed. The system may include a digital bandpass filter tuned to a frequency component corresponding to a rate at which spikes occurs in a pressure signal generated by a pressure sensor disposed at least partially within a stirred vessel, a statistical parameter generator to generate one or more first statistical parameters based on a filtered pressure signal, and an abnormal situation detector to detect at least one abnormal situation associated with an agitator of the stirred vessel based on the one or more first statistical parameters, and to generate one or more indicators of one or more abnormal situations situation are detected.

In yet another embodiment, a pressure transmitter for detecting an abnormal situation associated with a stirred vessel in a process plant is disclosed. The pressure transmitter may include a processor and a memory. A routine stored in the memory and adapted to be executed by the processor may receive data associated with a pressure signal generated by a pressure sensor disposed at least partially within a stirred vessel. Another routine stored in the memory and adapted to be executed by the processor may filter the received data to isolate a frequency component corresponding to a rate at which spikes occur in the pressure signal. A further routine stored in the memory and adapted to be executed by the processor may generate statistical data from the filtered data, wherein the statistical data comprises an indication of a standard deviation of the pressure signal at the frequency component. Yet another routine stored in the memory and adapted to be executed by the processor may analyze the statistical data may detect whether one or more abnormal situations associated with an agitator of the stirred vessel exist based on changes in the standard deviation of the pressure signal at the frequency component.

In still another embodiment, a pressure transmitter for detecting an abnormal situation associated with a stirred vessel in a process plant is disclosed. The pressure transmitter may include a processor and a memory. A routine stored in the memory and adapted to be executed by the processor may receive data associated with a pressure signal generated by a pressure sensor disposed at least partially within a stirred vessel. Another routine stored in the memory and adapted to be executed by the processor may filter the received data to isolate a frequency component corresponding to a rate at which spikes occur in the pressure signal. A further routine stored in the memory and adapted to be executed by the processor may generate first statistical data from the filtered data, wherein the first statistical data comprises an indication of a standard deviation of the pressure signal at the frequency component. Yet another routine stored in the memory and adapted to be executed by the processor may generate second statistical data from the unfiltered received data, wherein the second statistical data comprises an indication of a standard deviation of the unfiltered pressure signal. Still another routine stored in the memory and adapted to be executed by the processor may analyze the first statistical data and the second statistical data to detect whether one or more abnormal situations associated with an agitator of the stirred vessel exist based on changes in the standard deviation of the pressure signal at the frequency component and/or the standard deviation of the unfiltered pressure signal.

DETAILED DESCRIPTION

Figure 1:
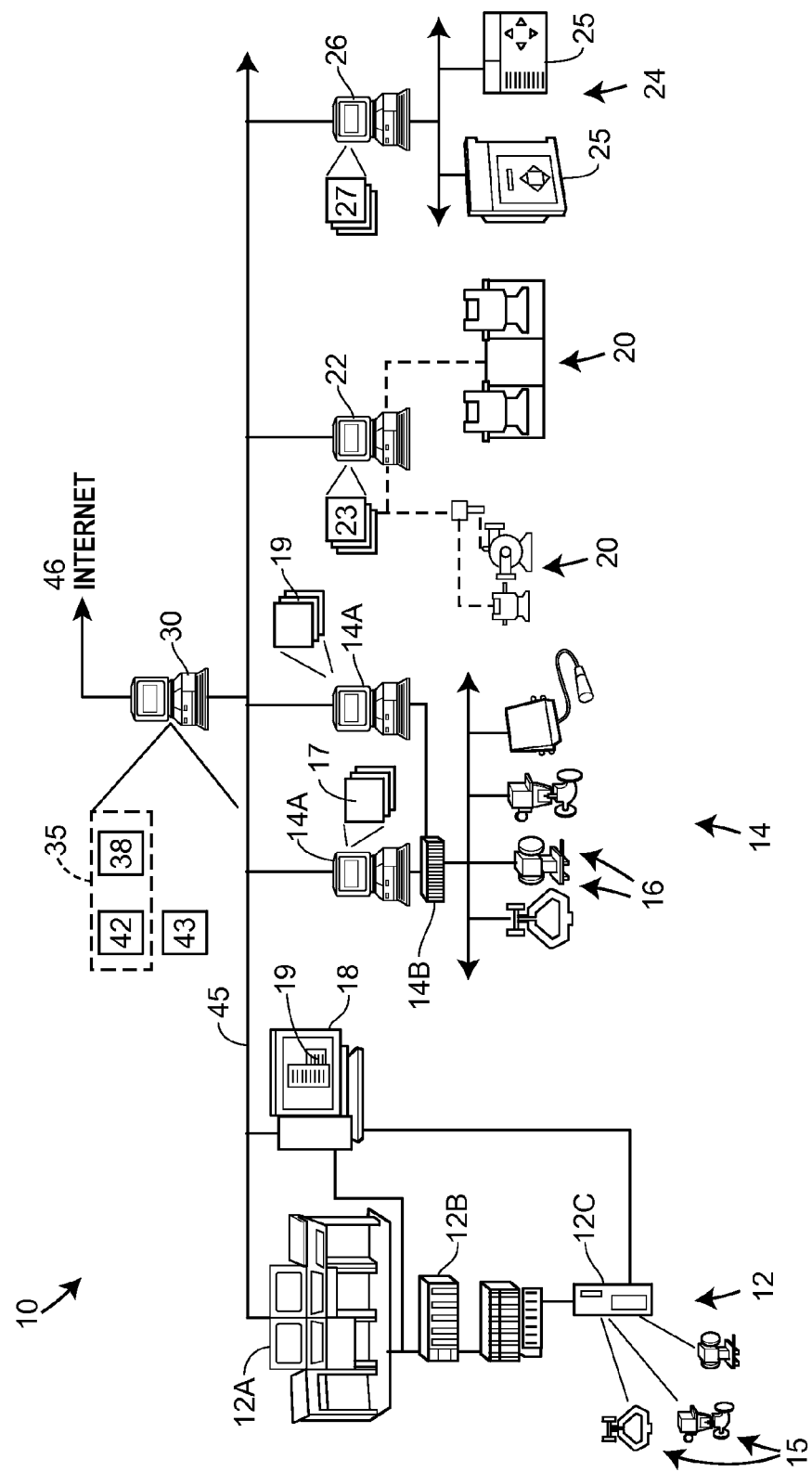
FIG. 1 is a block diagram of an example process plant control and diagnostics network.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the AMS™ Suite: Intelligent Device Manager application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42, which will be described in more detail below. Additionally, the computer system 30 may implement an alert/alarm application 43.

Generally speaking, the abnormal situation prevention system 35 may communicate with abnormal operation detection systems (not shown in FIG. 1) optionally located in the field devices 15, 16, the controllers 12B, 14B, the rotating equipment 20 or its supporting computer 22, the power generation equipment 25 or its supporting computer 26, and any other desired devices and equipment within the process plant 10, and/or the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each of at least some of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

Figure 2:
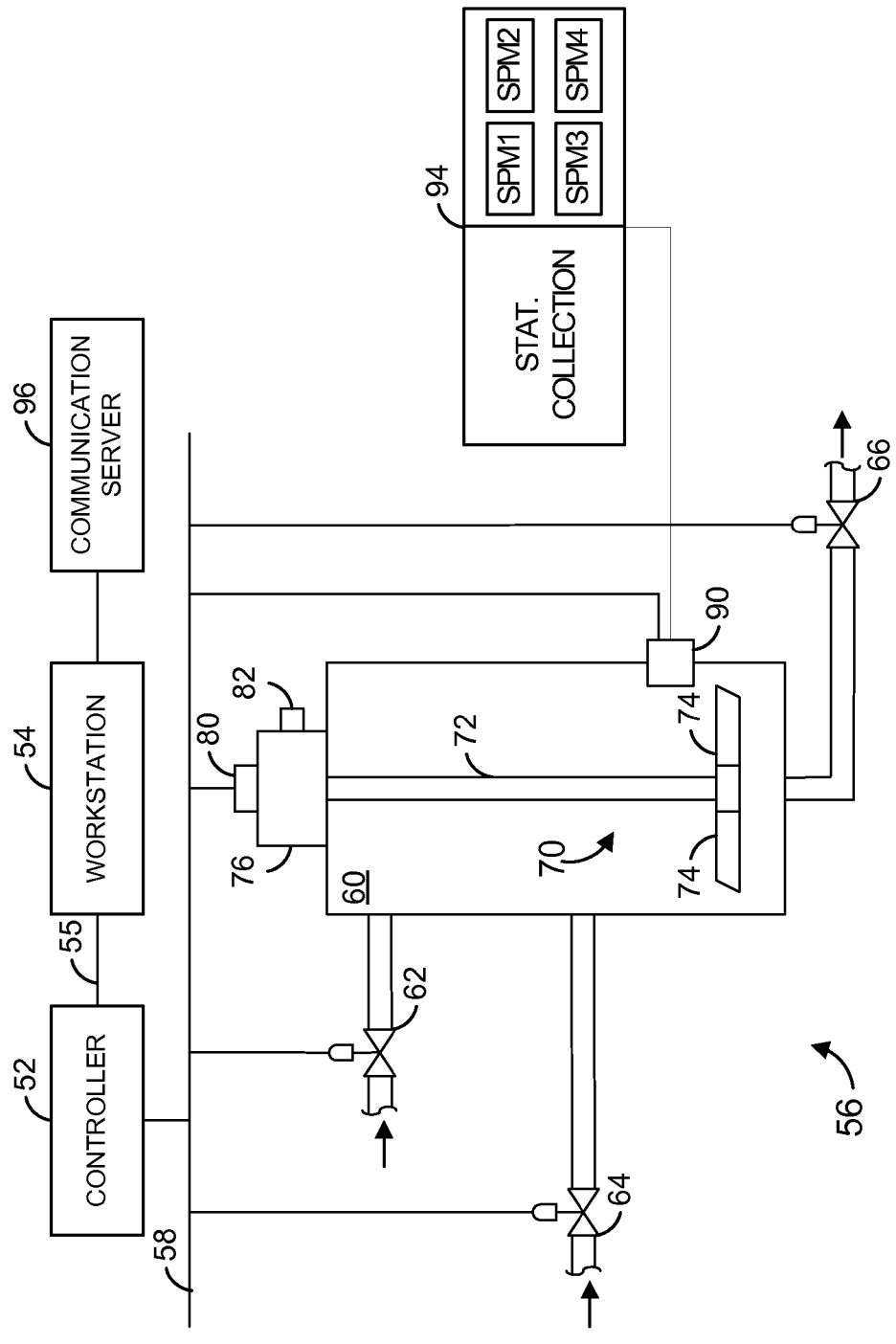
FIG. 2 is an exemplary block diagram of a portion of the process plant of FIG. 1, illustrating communication interconnections between various components of an abnormal situation prevention system located within a stirred vessel of the process plant.

FIG. 2 illustrates a portion 50 of the example process plant 10 of FIG. 1 for the purpose of describing one manner in which the abnormal situation prevention system 35 and/or the alert/alarm application 43 may communicate with a reactor unit in the portion 50 of the example process plant 10. While FIG. 2 illustrates communications between the abnormal situation prevention system 35 and one or more abnormal operation detection systems within the reactor unit, it will be understood that similar communications can occur between the abnormal situation prevention system 35 and other devices and equipment within the process plant 10, including any of the devices and equipment illustrated in FIG. 1. Although many of the examples provided herein are discussed with reference to a reactor unit, such as a stirred tank reactor, it should be understood that the examples may be applied to various stirred vessels, and are not limited to stirred vessels of reactors.

The portion 50 of the process plant 10 illustrated in FIG. 2 includes a process controller 52, which may be part of a distributed process control system having one or more process controllers, connected to a reactor unit 56 via input/output (I/O) cards or devices (not shown), which may be any desired types of I/O devices conforming to any desired communication or controller protocol. Additionally, the reactor unit 56 may conform to any desired open, proprietary or other communication or programming protocol, it being understood that the I/O devices must be compatible with the desired protocol used by the reactor unit 56. Although not entirely shown in detail, the reactor unit 56 may include any number of additional devices, including, but not limited to, field devices, HART devices, sensors, valves, transmitters, positioners, etc., some examples of which are described further below.

In any event, the process controller 52 may be coupled to one or more user interfaces or computers 54 (which may be any types of personal computers, workstations, etc.) accessible by plant personnel such as configuration engineers, process control operators, maintenance personnel, plant managers, supervisors, etc. via a communication link 55. The communication link 55 may comprise, for example, an Ethernet communications connection, or any other type of wired, optical, or wireless communications connection. Additionally, the communication link 55 may be a continuous or intermittent link. The workstation 54 (which may comprise, for example, a personal computer, a server, etc.) may be used by one or more engineers or operators to design process control routines to be executed by the process controller 52, to communicate with the process controller 52 so as to download process control routines, to receive and display information pertaining to the reactor unit 56 during operation of the process plant and to otherwise interact with the process control routines executed by the process controller 52.

The workstation 54 includes a memory (not shown) for storing applications, such as configuration design applications, maintenance applications, user interface applications, diagnostics applications, etc., and for storing data, such as configuration data, maintenance data, diagnostics data, etc., pertaining to the configuration of the reactor unit 56. The workstation 54 also includes a processor (not shown) that executes the applications to, among other things, enable a user to design process control routines and download those process control routines to the process controller 52. Likewise, the process controller 52 includes a memory (not shown) for storing configuration data and process control routines to be used to control the reactor unit 56 and includes a processor (not shown) that executes the process control routines to implement a process control strategy. If the process controller 52 is a DeltaV™ controller, it, in conjunction with one or more applications implemented by the workstation 54, may provide a graphical depiction of the process control routines within the process controller 52 to a user illustrating the control elements within the process control routine and the manner in which these control elements are configured to provide control of the reactor unit 56.

The controller 52 is also coupled to devices or equipment within a process plant via an input/output (I/O) device (not shown) and a set of communication lines or a bus 58. The communication lines or bus 58 may be implemented using any desired hardwired or wireless communication structure, and using any desired or suitable communication protocol such as, for example, an Ethernet protocol. In the example of FIG. 2, the process controller 52 is coupled to devices and equipment associated with the reactor unit 56. The process controller 52, which may be similar to the controllers 12B, 14B described above, is capable of communicating with control elements, such as field devices and function blocks within field devices distributed throughout the process plant to perform one or more process control routines to thereby implement desired control of the reactor unit 56. These process control routines may be continuous or batch process control routines or procedures.

In addition, a database (not shown) may be connected to the communication bus 58 to operate as a data historian that collects and stores configuration information as well as on-line process variable data, parameter data, status data, and other data associated with the process controller 52 and the reactor unit 56 within the process plant 10. Thus, the database may operate as a configuration database to store the current configuration, including process configuration modules, as well as control configuration information for the process control system as downloaded to and stored within the process controller 52 and the reactor unit 56. Likewise, the database may store historical abnormal situation prevention data, including statistical data collected by the reactor unit 56, statistical data determined from process variables collected by the reactor unit 56, and other types of data that will be described below.

While the process controller 52, I/O devices, and the reactor unit 56 may typically be located down within and distributed throughout the sometimes harsh plant environment, the workstation 54, and the database are usually located in control rooms, maintenance rooms or other less harsh environments easily accessible by operators, maintenance personnel, etc. Although only one reactor unit 56 is shown, it should be understood that a process plant 10 may have multiple reactor units, or multiple stirred vessels, along with various other types of equipment such as that shown in FIG. 1. The abnormal situation prevision techniques described herein may be equally applied to any of a number of stirred vessels.

Generally speaking, the process controllers 52 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

In the example portion 50 of the process plant 10 illustrated in FIG. 2, the controller 52 is communicatively coupled via the bus 58 to the reactor unit 56. The reactor unit 56 includes a stirred vessel 60, two input valves 62 and 64 connected so as to control fluid inlet lines providing fluid from, for example, a headtank (not shown) into the stirred vessel 60 and an output valve 66 connected so as to control fluid flow out of the stirred vessel 60 via an outlet fluid line. An agitator 70 is disposed within the stirred vessel 60. The agitator 70 includes a shaft 72 and blades 74 coupled to the shaft 72. A motor 76 coupled to the shaft 72 causes the shaft 72 and blades 74 to spin. A motor control element 80 is used to control the motor 76 and, thus, the agitator 70. A motor sensor 82, which may comprise, for example, a vibration sensor, a current load sensor, etc., may be used to monitor the operation of the motor 76. Generally, the agitator 70 disperses and mixes the reactants together uniformly throughout the stirred vessel 60. The agitator 70 further facilitates heat transfer from the mass of reacting fluid inside the stirred vessel 60 to a jacket or heat exchanger (not shown). Many chemical reactions carried out in this type of equipment are exothermic or heat generating, and the agitator 70 and cooling systems are generally relied upon to prevent a thermal runaway or explosion.

A pressure sensing device 90 may be disposed within, at least partially, the stirred vessel 60 to permit sensing of pressure within the stirred vessel 60. The pressure sensing device 90 may also be used to sense the level of material within the stirred vessel 60. In one implementation, the sensing device 90 may include, be part of or otherwise associated with a transmitter to provide collected data for processing, such as a statistical analysis for abnormal condition monitoring, for example. For example, the pressure sensing device 90 may comprise a flanged differential pressure sensor, a bubble tube pressure sensor, etc. coupled to a transmitter that transmits the collected pressure data for further analysis. In another example, the pressure sensing device may comprise a digital pressure transmitter, such as the Rosemount 3051S pressure transmitter sold by Emerson Process Management, that samples the pressure signal at a particular sampling rate (e.g., 22 Hz sampling).

As illustrated in FIG. 2, the process controller 52 is communicatively coupled to the valves 62, 64, and 66, to the motor control element 80, to the motor sensor 82, and to the pressure sensing device 90 via the bus 58 to control the operation of these elements and/or to receive data from these elements. Of course, the process controller 52 could be coupled to the elements of the reactor unit 56, or, more particularly, the stirred vessel 60, via additional busses, via dedicated communication lines, such as 4-20 ma lines, HART communication lines, etc.

The valves, sensors and other equipment illustrated in FIG. 2 may be any desired kind or type of equipment including, for example, Fieldbus field devices, standard 4-20 ma field devices, HART field devices, etc. and may communicate with the process controller 52 using any known or desired communication protocol such as the Fieldbus protocol, the HART protocol, the 4-20 ma analog protocol, etc. Still further, other types of devices may be connected to and be controlled by the process controller 52 in any desired manner. Also, other controllers may be connected to the process controller 52 and to the workstation 54 via, for example, the communication link 55 to control other devices or areas associated with the process plant and the operation of such additional controllers may be coordinated with the operation of the process controller 52 illustrated in FIG. 2 in any desired or known manner.

The pressure sensing device 90 may include a memory (not shown) for storing routines such as a routine for implementing statistical data collection pertaining to pressure sensed by the pressure sensing device 90. The pressure sensing device 90 may also include a processor (not shown) that executes routines such as a routine for implementing statistical data collection. The routines stored and implemented by the pressure sensing device 90 may include one or more blocks 94 for collecting and/or processing statistical data associated with the pressure sensing device 90. For example, the block 94 could comprise an advanced diagnostics block (ADB), which is a known Foundation Fieldbus function block that can be added to Fieldbus devices to collect and process statistical data within Fieldbus devices. Other types of blocks or modules could also be used to collect device data and calculate, determine, and/or process one or more statistical measures or parameters for that data. Moreover, the pressure sensing device 90 need not comprise a Fieldbus device. Further, the block 94 may be implemented by any combination of software, firmware, and/or hardware within the pressure sensing device 90.

While the block 94 is illustrated as being located in the pressure sensing device 90, the block 94 or a similar block could be located, in part or in whole, in any number of the other field devices 62, 64, 66, 80, and 82, and could be located, in part or in whole, in other devices, such as the process controller 52, an I/O device (not shown), the workstation 54, or some other device. It is to be understood that some or all of the other devices 62, 64, 66, 80, could implement other blocks or modules for collecting data associated with those other devices and for calculating, determining and/or processing one or more statistical measures or parameters for that data.

Generally speaking, the block 94, or sub-elements of the block 94, collects data, such as data related to the pressured sensed within the stirred vessel 60, and performs statistical processing or analysis on the data. The block 94 may include sub-elements such as one or more statistical process monitoring (SPM) blocks or units SPM1-SPM4 which may collect data related to the pressured sensed within the stirred vessel 60 or other data associated with the pressure sensing device 90 and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., of the collected data. The specific statistical data generated, and the method in which it is generated is not critical. Thus, different types of statistical data can be generated in addition to, or instead of, the specific types described above. Additionally, a variety of techniques, including known techniques, can be used to generate such data.

The term statistical process monitoring (SPM) block is used herein to describe functionality that performs statistical process monitoring on at least one process variable or other process parameter, and may be performed by any desired software, firmware or hardware implemented by or within the device or even outside of a device for which data is collected. It will be understood that, because the SPMs are generally implemented by, or as part of, the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the block 94 is shown to include SPM blocks in FIG. 2, the SPM blocks may instead be stand-alone blocks separate from the block 94, and may be located in the same stirred vessel as the corresponding block 94 or may be in a different device. The SPM blocks discussed herein may comprise known FOUNDATION™ Fieldbus SPM blocks, or SPM blocks that have different or additional capabilities as compared with known FOUNDATION ™ Fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the FOUNDATION™ Fieldbus protocol, or some other protocol, such as Profibus, HART, CAN, etc. protocol. If desired, the underlying operation of the block 94 may be performed or implemented at least partially as described in U.S. Pat. No. 6,017,143, which is hereby incorporated by reference herein in its entirety for all purposes.

It is to be understood, however, that the block 94 may be performed or implemented using techniques different than those described in U.S. Pat. No. 6,017,143. As just one example, U.S. Pat. No. 6,615,090 to Blevins et al. describes a variability index generator that generates a variability indication for a function block within a process plant. In general, the variability indication provides a statistical measurement of the deviation of a parameter associated with the device or function block from a set point or other value associated with the device or function block. U.S. Pat. No. 6,615,090 is hereby incorporated by reference herein in its entirety for all purposes.

It is to be further understood that although the block 94 is shown to include SPM blocks in FIG. 2, SPM blocks are not required of the block 94. For example, an abnormal operation detection routine of the block 94 could operate using process variable data not processed by an SPM block. As another example, the block 94 could receive and operate on data provided by one or more SPM blocks located in other devices. As yet another example, the process variable data could be processed in a manner that is not provided by many typical SPM blocks. As just one example, the process variable data could be filtered by a finite impulse response (FIR), as described further below, or infinite impulse response (IIR) filter such as a bandpass filter or some other type of filter. As another example, the process variable data could be trimmed so that it remained in a particular range. Of course, known SPM blocks could be modified to provide such different or additional processing capabilities.

Data gathered and generated by the block 94 may be made available to an external client, such as to the workstation 54 through the process controller 52 and the communication link 55. Additionally or in the alternative, data gathered and generated by the block 94 may be made available to the workstation 54 through, for example, a communication server 96. The communication server 96 may comprise, for example, an Object Linking & Embedding (OLE) for Process Control (OPC) server, a server configured to operate in an Ovation® communications network, a web server, etc. The communication server 96 may receive data gathered and generated by the block 94 via a communication link such as a wireless connection, a hardwired connection, an intermittent connection (such as one that uses one or more handheld devices), or any other desired communication connection using any desired or appropriate communication protocol. Of course, any of the communication connections described herein may use an OPC communication server to integrate data received from different types of devices in a common or consistent format.

Still further, it is possible to implement SPM blocks in a workstation, server, personal computer, etc., or other field devices separate from the device 90 to perform statistical process monitoring outside of the device 90 that collects or generates the raw data, such as pressure data. Thus, for example, one or more SPM blocks could be implemented by the workstation 54. These SPM blocks could collect raw pressure data via, for example, the process controller 52 or the communication server 96 and could calculate some statistical measure or parameter, such as a mean, a standard deviation, etc. for that pressure data. While these SPM blocks are not located in the device 90 which collects the data and, therefore, are generally not able to collect as much pressure data to perform the statistical calculations due to the communication requirements for this data, these blocks are helpful in determining statistical parameters for a device that does not have or support SPM functionality. Thus, it will be understood in the discussion below, that any statistical measurements or parameters described to be generated by SPM blocks, may be generated by SPM blocks implemented by the device 90 or by other devices.

Generally speaking, the process control and diagnostics system of FIG. 2 may be used to implement batch processes in which, for example, the workstation 54 executes a batch execution system that implements and coordinates different batch runs that utilize the reactor unit 56. Such a batch execution system may be stored in the workstation 54 of FIG. 2. The batch execution system could be stored in and executed in other workstations, or in other computers communicatively connected to the communication link 55 or the bus 58 in any desired manner, including in any wireless manner. Likewise, the batch execution system may be divided into various components or be associated with various components stored in and executed in different computers or workstations within the process plant. The process control and diagnostics system of FIG. 2 could similarly be used to implement a continuous process.

In operation, the process controller 52 may cause, via the motor control element 80, the motor 76 to turn the agitator 70. The motor control element 80 and/or the motor sensor 82 may provide data that indicates whether and/or at what speed the motor 76 is running. It may be difficult, however, to determine whether the agitator 72 is actually turning based on data provided by the motor control element 80 and/or the motor sensor 82. For example, if the shaft 72 broke or a coupling mechanism (not shown) between the motor 76 and the shaft 72 fails, the motor 76 may continue running but the agitator 70 might not turn or might turn at a much slower rate than expected.

As the blades 74 of the agitator 70 move past the pressure sensing device 90, the pressure sensed by the pressure sensing device 90 may change. For example, a spike in pressure may occur. If the agitator 70 includes two blades 74, two spikes in pressure may occur for each rotation of the agitator 70. Similarly, if the agitator 70 includes three blades 74, three spikes in pressure may occur for each rotation of the agitator 70. The pressure sensed by the pressure sensing device 90 may be used to detect an abnormal situation associated with the agitator 70. For example, the pressure sensed by the pressure sensing device 90 may be used to detect that the agitator has stopped turning or is turning at a slower rate than expected. Also, the pressure sensed by the pressure sensing device 90 may be used to detect other abnormal situations such as an agitator 30 that is out of balance, a broken blade 74, etc.

Although only one pressure sensing device is shown in FIG. 2, one or more additional pressure sensing devices may also be included. Each of these additional pressure sensing devices may include, or have associated therewith, a corresponding block for collecting and/or processing statistical data, similar to the block 94. Similarly, other types of sensing devices could be included, such as an audio sensor, to generate additional data associated with the stirred vessel that could be used in determining whether an abnormal situation associated with the agitator 70 exists.

Figure 3:
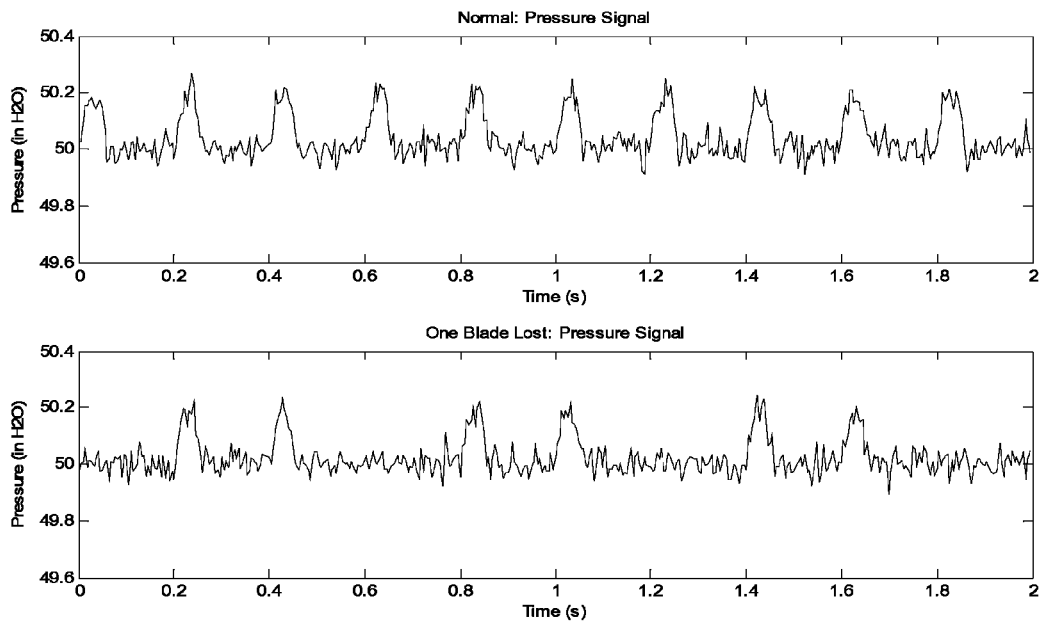
FIG. 3 is an example of graphs showing pressure spikes caused by trailing vortices in a stirred vessel during normal and abnormal operations.
Figure 4:
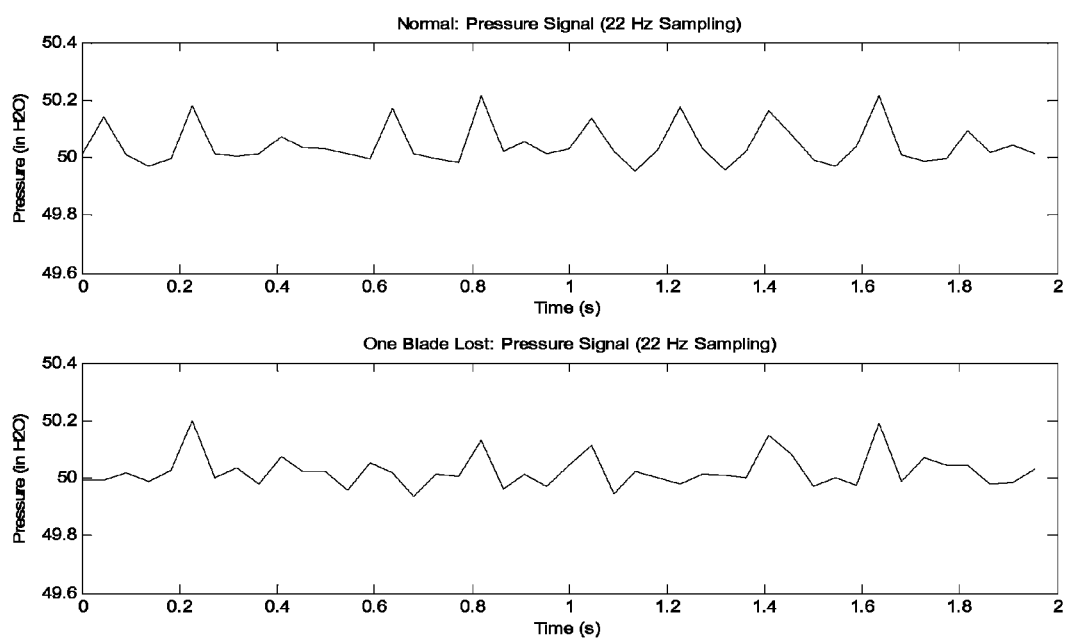
FIG. 4 is an example of graphs showing pressure sampled at a sampling frequency during normal and abnormal operations.

Referring to FIGS. 3 and 4, the pressure sensing device 90 may measure the pressure within the stirred vessel 60. These measurements may include a small pressure spike every time a blade 74 passes by the pressure sensing device 90. Generally, these small pressure spikes are caused by the trailing vortices being shed by the agitator blade tips as the tips move relative to the reaction fluid. The trailing vortices are uniquely associated with movement of a solid body thru a fluid. As such, the presence of these pressure spikes may be used to indicate that the agitator is turning. Under a normal operation, the pressure spikes may be detected at the following frequency:

$$f_{agitator} = n\frac{N}{60} \quad \text{(Equ. 1)}$$

where $f_{agitator}$ is the frequency of pulse train (in Hz), n is the agitator rotational speed (rpm) and N is the number of blades 74 on the agitator 70. An example of tracking the spikes in pressure is disclosed in U.S. Pat. No. 7,181,654, wherein the pulses in the pulse train were counted over a time interval and the count was divided the count by the time interval in order to calculate $f_{agitator}$. As further disclosed in U.S. Pat. No. 7,181,654, the frequency and magnitude of the pulses were tracked statistically, and changes in $f_{agitator}$ and/or the pulse magnitude statistics would be used to trigger an abnormal situation alert. By sensing the trailing vortices that are shed off the agitator blades as they rotate thru the fluid, a phenomenon is sensed that is tied to the actual movement of the agitator via fluid mechanical principles, rather than inferring agitator movement by monitoring the motor 76, motor control element 80 or motor sensor 82. Accordingly, more robust and detailed diagnostics of the health of the stirred vessel, and the agitator in particular, may be accomplished.

FIG. 3 illustrates example pressure graphs of the pressure within the stirred vessel 60 as the agitator 70 is rotating during a normal operation (upper graph) and when a blade has broken off (lower graph). In the examples shown, the pulse train appears approximately as illustrated in the upper graph of FIG. 3 for an agitator 70 spinning at 100 rpm, with three blades 74, and a static stirred vessel level of 50 inches of water. Generally, the pulse train appears as a small AC signal superimposed on top of a larger static stirred vessel level measurement signal (e.g., 50 inches water). The lower graph depicts an example of how the pulse train from the agitator 70 would be expected to look if one of the three blades 74 had fallen off. In particular, one out of every three pulses is missing from the signal, as compared to the upper graph.

As noted above, the pressure sensing device 90 may be a digital transmitter that samples the pressure signal at a particular sampling rate. FIG. 4 illustrates example pressure graphs of the pressure within the stirred vessel 60 taken at a sampling rate of 22 Hz as the agitator 70 is rotating during a normal operation (upper graph) and when a blade has broken off (lower graph). As seen from the graphs of FIG. 4, it is somewhat difficult to differentiate between the normal condition and the condition with one blade missing due to the presence of noise in the signal.

Figure 5:
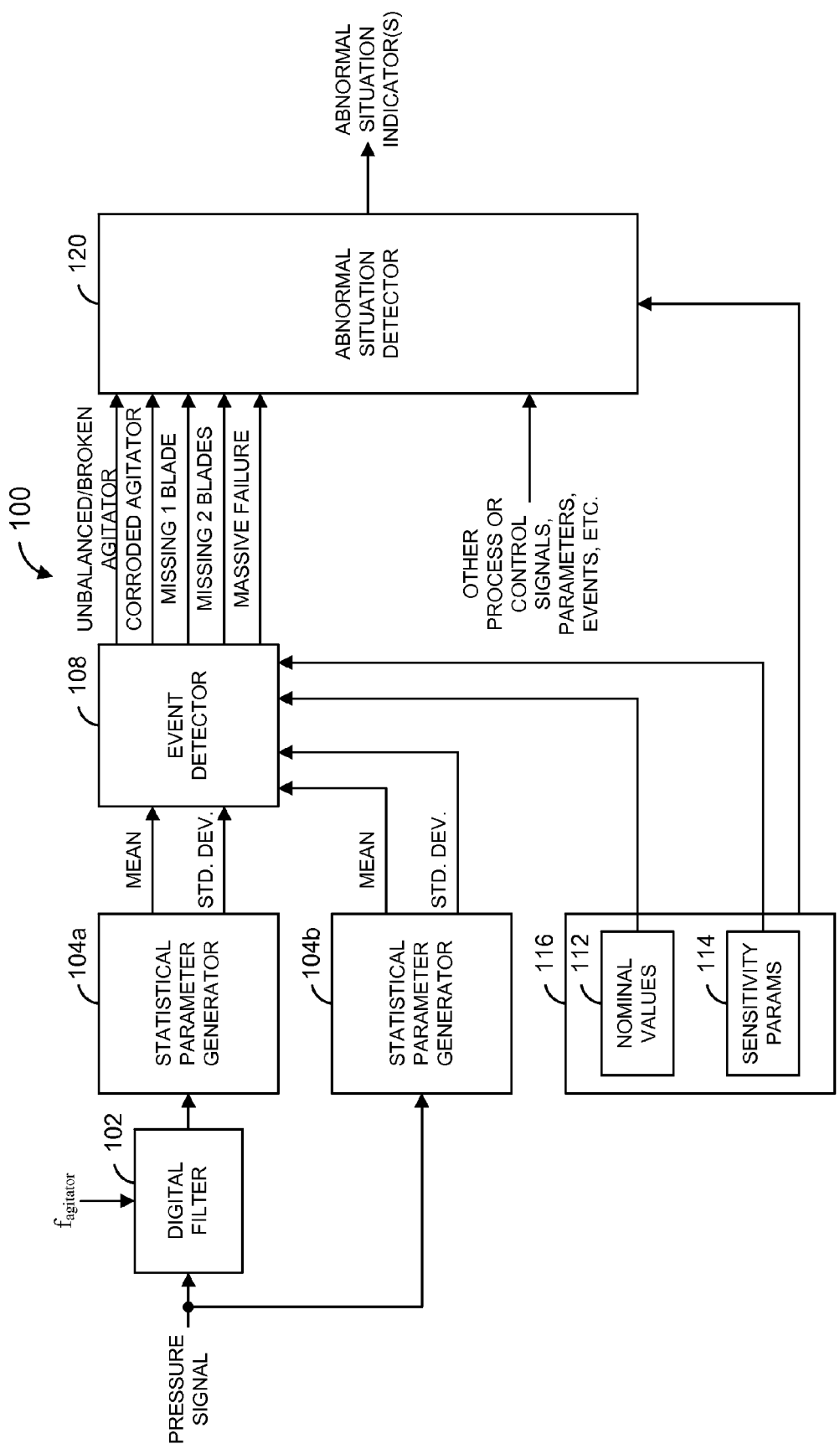
FIG. 5 is a block diagram of an example subsystem for generating an indicator of an abnormal situation based on a pressure signal.

FIG. 5 is a block diagram of an example subsystem 100 for generating statistical data associated with the pressure sensing device 90. The subsystem 100 may be implemented, for example, as part of the block 94 of FIG. 2, and may be implemented in whole or in part by the pressure sensing device 90. Further, each block illustrated in FIG. 5 may be implemented in whole or in part by the pressure sensing device 90. Thus, some or all of the subsystem 100 may be implemented by one or more other devices such as other field devices in the process plant 10, the process controller 52, the workstation 54, the communication server 96, or some other computing device associated with the process plant. The subsystem 100 includes aspects similar to those of a process device described in U.S. Pat. No. 6,017,143.

A digital filter 102 receives a pressure signal generated by the pressure sensing device 90. More particularly, the digital filter 102 receives the sampled pressure signal, which may be provided by the pressure sensing device 90 in the case of a digital transmitter, or by a transmitter that samples the pressure signal collected by the pressure sensing device 90. In one implementation, the digital filter 102 may be configured by a user to design a custom filter. For example, the digital filter 102 may be a finite impulse resistance filter, and, as a further example, the digital filter 102 may be a $16^{th}$ order filter. The digital filter 102 may be designed according to any of a number of filter algorithms, such as the Parks-McClellan algorithm. The algorithms may be used to design the digital filter 102, of given order, that most closely matches an ideal frequency component in the pressure signal, namely the frequency of the pulse train, $f_{agitator}$, as discussed above. As such, the digital filter 102 may be tuned to $f_{agitator}$. As should be understood, because a digital filter of finite order is being utilized, the digital filter 102 is not considered "perfect," and the actual filter may have some ripples.

A statistical parameter generator 104a receives a filtered pressure signal generated by the digital filter 102 and calculates statistical parameters for the filtered pressure signal. In one implementation, another statistical parameter generated 104b receives an unfiltered (e.g., raw) pressure signal generated by the pressure sensing device 90 and calculates statistical parameters for the unfiltered pressure signal. Each of these statistical parameters may include one or more of a standard deviation, a mean, a sample variance, a root-mean-square (RMS), a range ($\Delta R$) and rate of change (ROC) of the pressure signal, for example. Examples of equations for generating these parameters are:

$$\text{mean} = \frac{1}{N}\sum_{i=1}^{N} x_i \quad \text{(Equ. 2)}$$

$$\text{RMS} = \sqrt{\frac{1}{N}\sum_{i=1}^{N} x_i^2} \quad \text{(Equ. 3)}$$

$$\text{standard deviation} = \sqrt{\frac{1}{N-1}\sum_{i=1}^{N} (x_i - \text{mean})^2} \quad \text{(Equ. 4)}$$

$$ROC = \frac{x_i - x_{i-1}}{T} \quad \text{(Equ. 5)}$$

$$\Delta R = X_{MAX} - X_{MIN} \quad \text{(Equ. 6)}$$

where N is the total number of data points in the sample period, $x_i$ and $x_{i-1}$ are two consecutive values of the pressure signal and T is the time interval between the two values. Further, $X_{MAX}$ and $X_{MIN}$ are the respective maximum and minimum of the pressure signal over a sampling or training time period. These statistical parameters may be calculated using different equations or algorithms as well.

Also, other types of parameters may be generated in addition to, or instead of, these parameters. In one example, the statistical parameter generators 104a, 104b may comprise one or more ADBs and/or SPM blocks. For example, referring to FIG. 6, one implementation of an abnormal situation prevention block 130 is depicted. The abnormal situation prevention block 130 includes a digital filter 132, which may correspond to the digital filter 102 of FIG. 5, and an SPM block 134. The digital filter 132 includes a bandpass (BP) filter 136 tuned to the frequency of the pulse train, $f_{agitator}$, and may further include a multiplier 138 to scale the filtered signal by a gain factor, which may be fixed. The raw signal from the pressure sensing device 90 is sent through the filter 132 to isolate the frequency component $f_{agitator}$.

Figure 7:
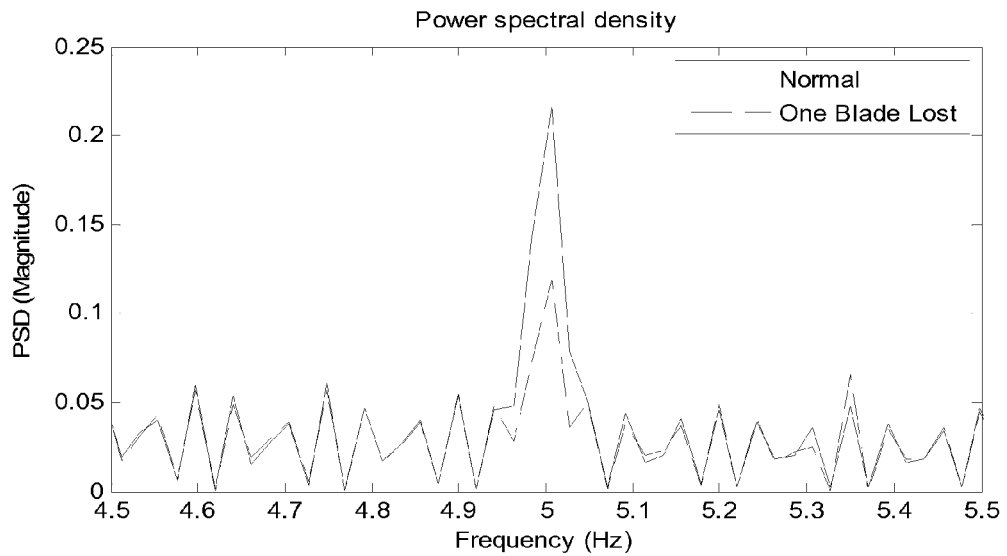
FIG. 7 is an example graph of a power spectral density of pressure sampled at a sampling frequency during normal and abnormal operations.

As discussed above with respect to FIG. 4, a pressure signal sampled at a particular rate (e.g., 22 Hz), and, more particularly, the raw pulse train signal sampled at the sampling frequency for the case of a missing blade (lower graph) is difficult to discern from a normal operating condition (upper graph). However, a power spectral density analysis of the two sampled pressure signals, as shown in FIG. 7, shows that in almost the entire frequency spectrum, the signal from the normal operating condition looks the same as that from the condition with a missing blade. However, there is a small frequency component of the spectrum, concentrated around $f_{agitator}$ (5 Hz in this example), in which there is a significant difference between the normal (solid line) and abnormal (dotted line) signals. Using a digital filter designed to isolate the frequency component for $f_{agitator}$ (i.e., pass the frequency components around $f_{agitator}$, which is 5 Hz in example shown), the remaining frequency components may be eliminated.

Figure 8:
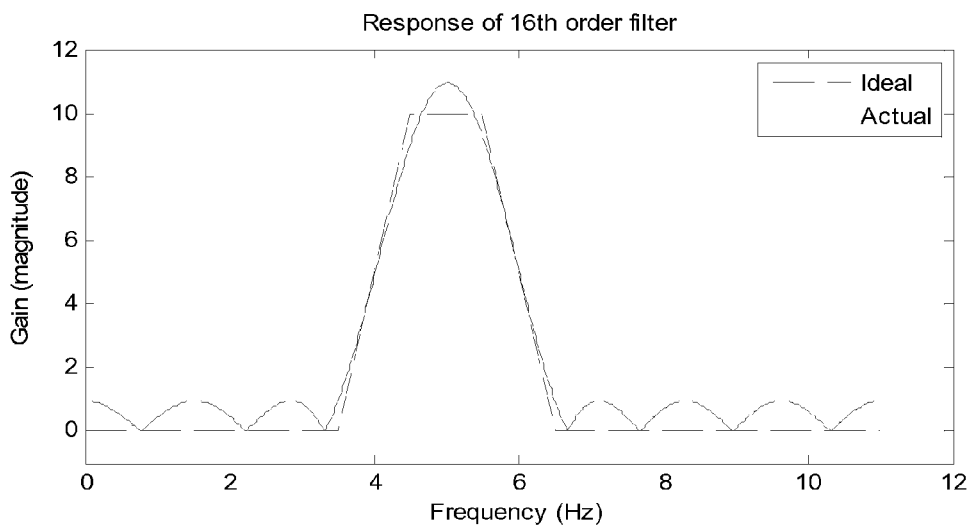
FIG. 8 is an example of graph of a frequency response of an example digital filter, such as the digital filter of FIG. 6.

An example of a $16^{th}$ order digital filter is shown in FIG. 8. As noted above, the digital filter is not perfect due to the finite order, but is nonetheless sufficient for isolating $f_{agitator}$. In the example shown in FIG. 8, the digital filter has a passband of 4.5 to 5.5 Hz, a stop-band 0 to 3.5 and 6.5 to 11 Hz, and the remaining spectrum as the transition region.

Figure 9:
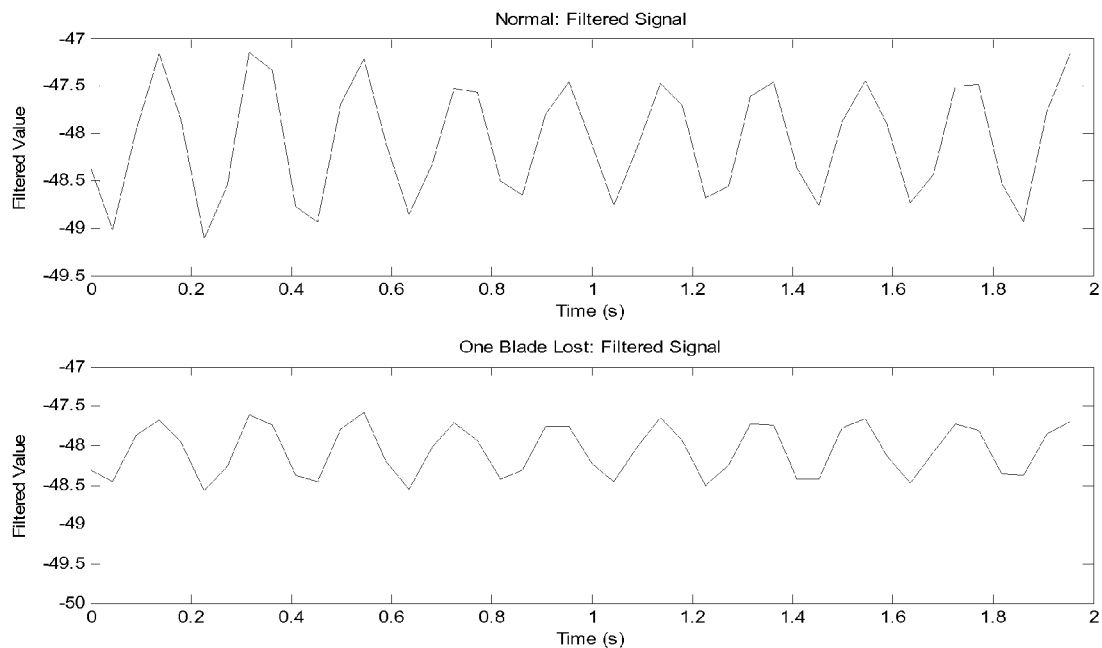
FIG. 9 is an example of graphs showing a filtered pressure signal sampled at a sampling frequency during normal and abnormal operations.

Referring again to FIG. 6, the multiplication block may be utilized because the magnitude of the detected pulse train may be much smaller than the static stirred vessel level signal and to compensate for insufficient resolution to process the signal after filtering. In particular, for the pass-band range, the gain factor (e.g., 10) is applied due to a relatively small pulse magnitude. FIG. 9 illustrates an example of the normal and the abnormal (e.g., missing blade) raw pressure signals, after passing them through a $16^{th}$ order filter such as the filter of FIG. 8. As seen in FIG. 9, the amplitude of oscillation is smaller in the abnormal case (lower graph) than it is in the normal case (upper graph).

Figure 10:
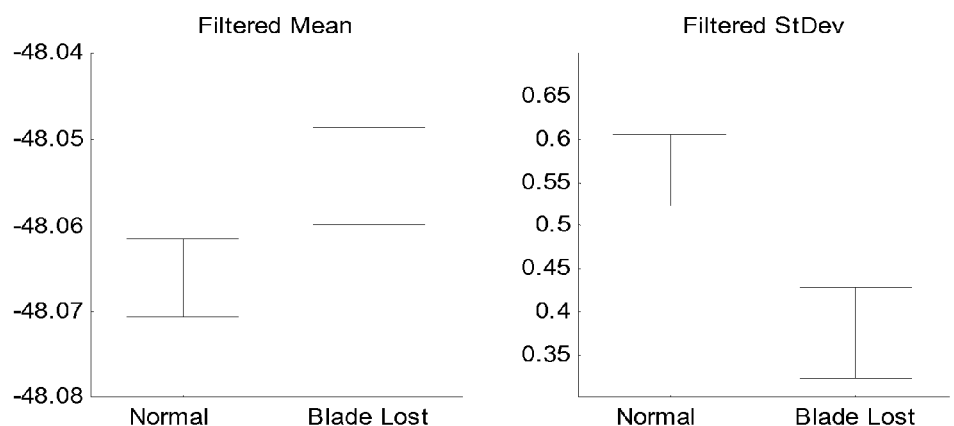
FIG. 10 is an example of graphs showing statistical signatures of a filtered pressure signal sampled at a sampling frequency during normal and abnormal operations.

After filtering and scaling, the mean and standard deviation are calculated by the SPM block 134. As discussed further below, changes in one or both of these statistical parameters may be used to detect various modes of agitator failure. The abnormal situation prevention block 130 calculates the mean and standard deviation of the filtered pressure signal over a particular sampling window (e.g., 10 seconds). However, due to random noise in the pressure signal, the statistical calculations are generally not exactly the same for each 10 second window. FIG. 10 illustrates the maximum and minimum mean and standard deviation values calculated from one example set of data for both the normal and abnormal operating conditions. The comparison of mean calculations demonstrates that for both the normal and abnormal conditions, the means are very close (e.g., approximately a 0.02% difference), whereas the standard deviation calculations show a distinct drop (approximately 33%) from the normal condition to the abnormal condition. Therefore, the standard deviation of the filtered pressure data may be used to detect loss of agitation in a stirred tank, and, more particularly, to detect various events associated with loss of agitation.

Referring again to FIG. 5, one or more of the statistical parameters from the statistical parameter generators 104a, 104b may be provided to an event detector 108. The event detector 108 may also receive nominal values 112 and sensitivity parameters 114 from a memory 116. The nominal values 112 may comprise, for example, the nominal or baseline (i.e., typical) statistical parameter values corresponding to the statistical parameters generated by the statistical parameter generators 104a, 104b. The nominal values may be, for example, generated by the statistical parameter generators 104a, 104b, each of which generates, or learns, the nominal or normal statistical parameters during normal operation of the process. These statistical parameters can be used to generate the nominal values 112 in the memory 116 for future use. This may allow, for example, dynamic adjustment of nominal values 112 for different operating conditions. In this example, the statistical parameters generated by the statistical parameter generators 104a, 104b may be monitored for a user selectable period of time. As another example, the nominal values may be provided by the manufacturer of the pressure sensing device 90 and stored in the memory 116 during manufacture. As yet another example, the nominal values may be updated, periodically or otherwise, by sending nominal values to the pressure sensing device 90 via the bus 58 (FIG. 2).

Each sensitivity parameter value 114 may provide, for example, an acceptable range or relationship as determined by the appropriate rule between the calculated statistical parameters and the appropriate nominal values generated by the statistical parameter generators 104a, 104b. The sensitivity parameter values 114 may be, for example, set by the manufacturer, received via the bus 58, etc. The sensitivity parameters 114 may be adjusted for the specific application.

The event detector 108 may generate indications of one or more events associated with the one or more parameters generated by the parameter generators 104a, 104b. Generally, the event detector 108 monitors the standard deviation and the mean of the filtered and unfiltered pressure data, and detects variations in the standard deviations and means. An indication may be generated by the event detector 108, for example, when the standard deviation and mean of the filtered pressure signal changes over time from a nominal value. In one example, the mean and standard deviation of the filtered pressure signal, the nominal value of the mean and standard deviation may be analyzed to detect the examples of events discussed below. In some of the events, the event may be determined based on the statistical parameters of both the unfiltered pressure signal and the filtered pressure signal, the event may be determined based on the statistical parameters of the filtered pressure signal alone, and, in other instances, based on statistical parameters of the unfiltered pressure signal. The event detector 108 may detect other events in addition to, or instead of, these event.

Unbalanced or Broken Agitator

An indication of an unbalanced or broken agitator 70, such as when the agitator 70 falls off or the shaft 72 or the agitator breaks, may be generated, for example, when the standard deviation and mean of the filtered pressure signal are at zero or approaching zero. The standard deviation and mean of the filtered pressure signal may be used alone or in conjunction with the standard deviation and mean of the unfiltered pressure signal. If used in conjunction with the standard deviation and mean of the unfiltered pressure signal, an unbalanced or broken agitator event may be detected when the standard deviation and mean of the unfiltered pressure signal are also at zero or approaching zero. Unbalanced or broken agitator event detection sensitivity may be controlled by one or more sensitivity parameters, which may represent a percentage above or below the nominal mean and the nominal standard deviation that is tolerable before an unbalanced or broken agitator event is detected, or, more particularly, a percentage within "zero". The event detector 108 may determine if unbalanced or broken agitator events occur according to the following example rules:

if standard deviation (filtered)→0 and mean (filtered)→0
   then unbalanced or broken agitator event detected, or
   if standard deviation (filtered)→0 and mean (filtered)→0 and
   if standard deviation (unfiltered)→0 and mean (unfiltered) not changed then unbalanced or broken agitator event detected where the value of mean (filtered) and standard deviation (filtered) are the current mean and standard deviation of the filtered pressure signal generated from the statistical parameter generator 104a, and the value of mean (unfiltered) and standard deviation (unfiltered) are the current mean and standard deviation of the unfiltered pressure signal generated from the statistical parameter generator 104b. The means and standard deviations may be monitored over time, and an unbalanced or broken agitator event may be detected only if, over a series of consecutive sampling periods, the standard deviation and mean of the filtered data is at or approaching zero, and, in one implementation, if the standard deviation of the unfiltered data is at or approaching zero and the mean of the unfiltered data is unchanged. Optionally, the standard deviations and means of the filtered and unfiltered data may be compared to respective nominal values of the standard deviations and means expected when the agitator stops, for example if the motor is stopped, within some level of tolerance as determined by the sensitivity parameter, where the nominal values and sensitivity parameters may be retrieved from the memory 116. For example, a sensitivity parameter may be applied to the detection of unchanged statistical values to define no detectable change, while accounting for slight variations which may be due to noise or other factors that should not result in a determination that a change occurred.

The nominal values and/or sensitivity parameters may be different for the standard deviation and mean, and may further be different for the filtered and unfiltered pressure signal parameters. As discussed further below, the detection of an unbalanced or broken agitator event may be provided as a potential unbalanced or broken agitator event that utilizes further process or control signals, parameters or events to differentiate the event from other possible events, which may or may not be abnormal conditions.

Corroded Agitator

An indication of a corroded agitator event may be generated, for example, when a standard deviation of the filtered pressure data deviates by a certain level above or below the nominal standard deviation value for the filtered pressure data. Optionally, the standard deviation of the filtered pressure data may be monitored over time, and if the standard deviation continues to move away from the nominal standard deviation value, then it may be determined that the event is a corroded agitator event. Additionally, the mean of the filtered pressure data may be monitored over time, and if the mean is not continuing to move away from a nominal mean value for the filtered data, then it may be determined that the event is a corroded agitator event.

However, it is noted that a decrease in the standard deviation of the filtered pressure data may relate to events other than a corroded agitator, examples of which are provided below. As one example to differentiate a corroded agitator event from other events, the event detector 108 may monitor the standard deviation of the unfiltered pressure data. If the standard deviation of the unfiltered pressure data is also deviating by a certain level above or below the nominal standard deviation value for the unfiltered pressure data, then it may be determined that the event is a corroded agitator. If not, then it may be determined that the event is something else. Additionally, the mean of the unfiltered pressure data may be monitored over time, and if the mean is not continuing to move away from a nominal mean value for the unfiltered data, then it may be determined that the event is a corroded agitator event.

The event detector 108 may determine if unbalanced or broken agitator events occur according to the following example rules:
   if standard deviation (filtered) decreases and mean (filtered) not changed and
   if standard deviation (unfiltered) decreases and mean (unfiltered) not changed then corroded agitator event detected, or
   if standard deviation (filtered)≦standard deviation' (filtered) (1−α) and
   if standard deviation (unfiltered)≦ standard deviation' (unfiltered) (1−β) then corroded agitator event detected, where the value of the mean (filtered) and the standard deviation (filtered) are the current mean and standard deviation of the filtered pressure signal generated from the statistical parameter generator 104a, and the value of mean (unfiltered) and standard deviation (unfiltered) are the current mean and standard deviation of the unfiltered pressure signal generated from the statistical parameter generator 104b, and where the values of standard deviation' and sensitivity parameters α, β for filtered and unfiltered pressure data are obtained from the memory 116. The nominal values of the standard deviations (standard deviation') may be learned by the subsystem 100 during normal operation of the process. The sensitivity parameters α, β may be used to account for a range of tolerance (e.g., 10%) from the standard deviation' for the filtered and unfiltered pressure signal, where values outside the range result in detection of a corroded agitator event. Although not shown in the above example rules, sensitivity parameters may also be applied to the mean values for the filtered and unfiltered pressure signal, where no change is detected if the value of the mean is within the tolerance range permitted by the sensitivity parameter.

Missing One Blade

An indication of a missing blade event may be generated if the standard deviation of the filtered pressure signal deviates beyond a threshold. In one example, missing blade detection sensitivity may be adjusted by adjusting a sensitivity parameter delta (δ), which is an amount that the current standard deviation (filtered) can deviate from the nominal standard deviation value (standard deviation' (filtered)) before an indication of a noise event is generated. For example, one missing blade in a three blade agitator results in the nonoccurrence of every third spike in pressure (see FIG. 3), and the standard deviation (filtered) decreases by one-third. As such, to detect a missing blade event when one of three blades is missing, δ should be set to one-third. As seen from the example below for multiple missing blades, it should be understood that the value of δ may be set to the inverse of the number of blades in the agitator multiplies by the number of missing blades to be detected.

In order to differentiate between a missing blade event from a corroded agitator event, which also has a decreasing standard deviation (filtered) that may decrease as much as for a missing blade event (e.g., by ⅓), the standard deviation of the unfiltered pressure signal may be utilized. As noted above for a corroded agitator event, the standard deviation (unfiltered) decreases, but for a missing blade event the standard deviation (unfiltered) generally remains the same. Example rules for determining whether a missing blade event has occurred is:

if standard deviation (filtered) decreases by δ and mean (filtered) not changed and if standard deviation (unfiltered) not changed and mean (unfiltered) not changed then missing blade event detected, or if standard deviation (filtered)=(1−δ)·standard deviation' (filtered) (1±γ) and if standard deviation (unfiltered)=standard deviation' (unfiltered) (1±η) then missing blade event detected, where the value of δ is the inverse of the number of blades of the agitator multiplied by the number of missing blades to be detected (i.e., one for a missing blade event), the value of the mean (filtered) and the standard deviation (filtered) are the current mean and standard deviation of the filtered pressure signal generated from the statistical parameter generator 104a, the value of mean (unfiltered) and standard deviation (unfiltered) are the current mean and standard deviation of the unfiltered pressure signal generated from the statistical parameter generator 104b, and the values of standard deviation' and sensitivity parameters γ, η for filtered and unfiltered pressure data are obtained from the memory 116. The sensitivity parameters γ, η may be used to account for a range of tolerance (e.g., 10%) from the standard deviation' for the filtered and unfiltered pressure signal, where values within the range result a determination that the standard deviation (filtered) has deviated by δ and that the standard deviation (unfiltered) remains unchanged. Although not shown in the above example rules, sensitivity parameters may also be applied to the mean values for the filtered and unfiltered pressure signal, as discussed above for the corroded agitator event.

Multiple Missing Blades

A multiple missing blade event is an event similar to that of a missing blade event (e.g., one blade missing), except that the value of δ is adjusted to detect the number of multiple blades missing. For example, to detect a two missing blade event in a three blade agitator, the value of δ may be set to two-thirds. Again, in order to differentiate between a multiple missing blades event from a corroded agitator event, which also has a decreasing standard deviation (filtered) that may decrease as much as for a multiple missing blades event (e.g., by ⅔), the standard deviation of the unfiltered pressure signal may be utilized. Whereas the standard deviation (unfiltered) decreases for a corroded agitator event, the standard deviation (unfiltered) generally remains the same as a multiple missing blades event. Example rules for determining whether a multiple missing blades event has occurred is:

if standard deviation (filtered) decreases by δ and mean (filtered) not changed and if standard deviation (unfiltered) not changed and mean (unfiltered) not changed then missing blade event detected, or if standard deviation (filtered)=(1−δ)·standard deviation' (filtered) (1±γ) and if standard deviation (unfiltered)=standard deviation' (unfiltered) (1±η) then multiple missing blades event detected, where the value of δ is the inverse of the number of blades of the agitator multiplied by the number of missing blades to be detected (i.e., two for a two missing blade event), the value of the mean (filtered) and the standard deviation (filtered) are the current mean and standard deviation of the filtered pressure signal generated from the statistical parameter generator 104a, the value of mean (unfiltered) and standard deviation (unfiltered) are the current mean and standard deviation of the unfiltered pressure signal generated from the statistical parameter generator 104b, and the values of standard deviation' and sensitivity parameters γ, η for filtered and unfiltered pressure data are obtained from the memory 116. Although the sameسensitivity parameters γ, η are shown as for a missing blade event (e.g., the range of tolerance is the same), different sensitivity parameters may be used for a multiple missing blades event. As above, while not shown in the above example rules, sensitivity parameters may also be applied to the mean values for the filtered and unfiltered pressure signal, as discussed above.

Massive Failure

A massive failure event is an event in which the standard deviation of the pressure signal deviates by an extreme value. Massive failure events may be the result of gear box failure, shear pin failure, shaft failure, impellor falling off shaft, massive corrosion, etc. Sensitivity to changes in the pressure signal, for example as distinguished from a missing blade or multiple missing blades events, may be controlled by adjusting a sensitivity parameter delta (λ), which may indicate deviation in the standard deviation of the filtered pressure signal before a massive failure event is detected. For example, if the user wishes to detect any decreases in the standard deviation of more than 75%, λ may be set to 0.75. The standard deviation of the unfiltered pressure signal may be utilized to distinguish from other events, such as the corroded agitator and unbalanced or broken agitator events. An example rule is:

if standard deviation (filtered) decreases by at least λ and mean (filtered) not changed and if standard deviation (unfiltered) not changed and mean (unfiltered) not changed then massive failure event detected, or if standard deviation (filtered)≦λ·standard deviation' (filtered) (1±γ) and if standard deviation (unfiltered)=standard deviation' (unfiltered) (1±η) then massive failure event detected, where the value of λ is the threshold value of the change in the standard deviation (filtered) at which a massive failure event will be detected, the value of the mean (filtered) and the standard deviation (filtered) are the current mean and standard deviation of the filtered pressure signal generated from the statistical parameter generator 104a, the value of mean (unfiltered) and standard deviation (unfiltered) are the current mean and standard deviation of the unfiltered pressure signal generated from the statistical parameter generator 104b, and the values of standard deviation' and sensitivity parameters γ, η for filtered and unfiltered pressure data are obtained from the memory 116. Although the same sensitivity parameters γ, η are shown as for a missing blade event (e.g., the range of tolerance is the same), different sensitivity parameters may be used for a massive failure event. Sensitivity parameters may also be applied to the mean values for the filtered and unfiltered pressure signal, as discussed above.

It should be understood that other rules may be implemented to observe the above discussed events as well as other events related to the filtered pressure signal, and different formulas, equations, computational techniques, etc., may be used to detect events. For example, statistical values of the unfiltered pressure signal may or may not be utilized depending on whether such values are needed to differentiate from other types of events that need to be detected. Further, also many of the above rules utilize a mean of both the filtered and unfiltered pressure signal, the events may just as easily be detected without the means. For example, as shown in FIG. 10, means of the filtered pressure data between normal and abnormal conditions are very close, which may make it difficult to determine an abnormal condition, much less to identify the abnormal condition event. The mean values of the unfiltered pressure signal in each of the above-mentioned events remain unchanged and need not be used to differentiate between the various events. Further, the mean values of the filtered pressure signal in the corroded agitator event, the missing blade event and the multiple missing blades event also remain unchanged in each instance and need not be used to differentiate between these events. As such, the standard deviation of the filtered pressure signal may be used to detect each the above-mentioned events, with the standard deviation of the unfiltered pressure signal used to differentiate between a corroded agitator event and the missing blade or multiple missing blades events.

Detecting an event may include analyzing more than one statistical parameter generated by the statistical parameter generators 104a, 104b, analyzing statistical parameters based on signals other than the pressure signal, etc. For example, statistical parameters may be generated by the motor control element 80 and/or the motor sensor 82 (using a subsystem similar to the subsystem 100, for example) based on data obtained by the motor control element 80 and/or the motor sensor 82. The event detector 108 could receive one or more of the statistical parameters generated by the motor control element 80 and/or the motor sensor 82 and use these parameters in analyzing whether events have occurred. Similarly, statistical parameters or other types of data from additional pressure sensor devices or other devices could be analyzed by the statistical parameter generators 104a, 104b to detect an event associated with the pressure signal.

As one example, nominal values may be obtained by first determining that the pressure or the process is stable, and then generating the statistical parameters for a selectable period of time. These statistical parameter values may be stored as the nominal values. The selectable period of time should be about the same as sampling period or block used to generate the statistical parameters during operation, but in some instances or implementations the selectable period of time may be different (even significantly so) than the sampling period or block used to generate the statistical parameters during operation. Such a process may be user initiated or automated, for example.

The event detector 108 may be implemented using any number of techniques. For example, the event detector 108 may comprise one or more of a rule-based engine, a fuzzy logic engine, a pattern detector, a neural network, etc. Additionally, the example event detector 108 discussed above provides indications of whether events have occurred based upon the operation of rules. It should be understood that, in other examples, an output of the event detector 108 corresponding to an event may have a plurality of discrete or continuous values.

The subsystem 100 further includes an abnormal situation detector 120. The abnormal situation detector 120 analyzes the outputs generated by the event detector 108 to generate an indicator (or indicators) of whether an abnormal situation exists with respect to the agitator 70. The abnormal situation detector 120 may also analyze the pressure signal and data stored in the memory 116. Further, the abnormal situation detector 120 may receive other data via, for example, the bus 58 (FIG. 2) such as other process or control signals, statistical parameters or event indicators generated by subsystems similar to the subsystem 100 corresponding to other devices in the process plant, etc. As one example, statistical parameters and/or statistical events may be generated by the motor control element 80 and/or the motor sensor 82 (using a subsystem similar to the subsystem 100, for example) based on data obtained by the motor control element 80 and/or the motor sensor 82. The abnormal situation detector 120 could receive one or more of these statistical parameters and use these parameters and events in analyzing whether one or more abnormal situations associated with the agitator 70 exist. For instance, the standard deviations and means for the filtered and unfiltered pressure signals are generally the same for both the unbalanced or broken agitator event and for a stopped agitator event. The abnormal situation may use signals from the motor control element 80 and/or the motor sensor 82, and/or statistical signatures thereof, to determine if the motor was stopped (stopper agitator event) or if the motor is running (unbalanced/broken agitator event), to differentiate the two events. As another example, statistical parameters or other types of data from additional pressure sensor devices or other devices could be analyzed by the abnormal situation detector 120 to generate the indicator (or indicators) of whether an abnormal situation exists.

The indicator(s) generated by the abnormal situation detector 120 may comprise, for example, an alert, an alarm, etc. Referring also to FIG. 1, if the abnormal situation detector 120 is implemented by the device 90, the indicator(s) may be transmitted to another device such as the controller 52, the workstation 54, the communication server 96, etc., so that, for example, an operator can be made aware of the indicator(s). The device 90 could transmit the indicator at its own initiative or at the request of some other device. For example, some other device such as the controller 52, the workstation 54, the communication server 96, etc., could poll the device 90 as to whether it has detected an abnormal situation associated with the agitator. In response, the device 90 could transmit the indicator via the bus 58 or some other communication link. As another example, the indicator could be stored in a memory and some other device could read the memory to determine if an abnormal situation associated with the agitator had been detected.

The output of the abnormal situation detector 120 could be used, not merely to notify an operator, but also to, for example, directly affect control of the stirred vessel 60, the reactor unit 56 or some other portion of the process plant. For example, the indicator generated by the abnormal situation detector could be provided to one or more of a control block or routine, to a maintenance system, etc. For instance, the output of the abnormal situation detector 120 could be provided to the controller 52 which could shut down the stirred vessel 60 or the reactor unit 56 if one or more abnormal situations are detected.

The abnormal situation detector 120 may be implemented using any number of techniques. For example, the abnormal situation detector 120 may comprise one or more of a rule-based engine, a fuzzy logic engine, a pattern detector, a neural network, etc. In some implementations, the event detector 108 may be omitted, and the parameters generated by the statistical parameter generators 104a, 104b may be provided directly to the abnormal situation detector 120.

Figure 11:
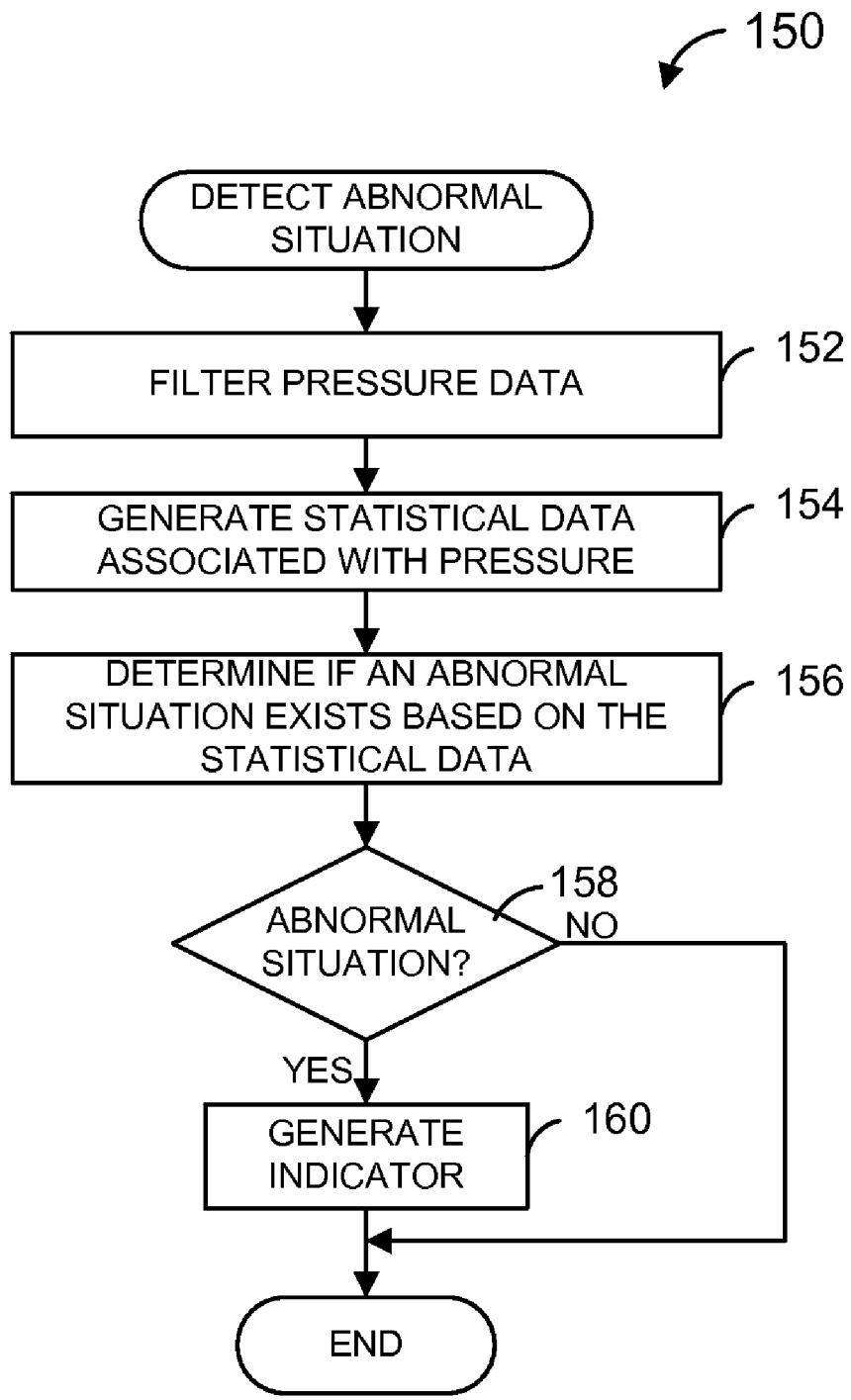
FIG. 11 is a flow diagram of an example method for detecting an abnormal situation associated with an agitator of a stirred vessel in a process plant.

FIG. 11 is a flow diagram of an example method 150 that may be implemented by the subsystem 100 of FIG. 5 to detect an abnormal condition associated with an agitator of a stirred vessel. For example, the method 150 may be used to detect if the agitator is broken and/or has stopped turning. Although FIG. 11 will be discussed with reference to FIG. 5, it is to be understood that the method 150 or a similar method could be implemented by a system different than the subsystem 100.

At a block 152, raw pressure data from a pressure sensor or transmitter, such as the sensing device 90, is collected and filtered according to a digital filter, such as the digital filter 102, 132 to isolate the frequency component $f_{agitation}$. At a block 154, statistical data associated with filtered pressure sensed within a stirred vessel is received. With respect to the example subsystem 100 of FIG. 5, the abnormal situation detector 120 may receive statistical parameters from the statistical parameter generator 104a and/or indications of events from the event detector 108. From another viewpoint, the event detector 108 may receive statistical parameters from the statistical parameter generators 104a.

In general, the statistical data received at the block 154 may comprise, for example, one or more of a mean, a variance, a standard deviation, a root-mean square, a rate of change, a range, etc., associated with a pressure signal. Additionally or alternatively, the statistical data may comprise one or more indicators of events such as unbalanced/broken agitator, corroded agitator, missing blade, multiple missing blades, massive failure, etc. The statistical data may comprise other statistical measures or indicators associated with the pressure signal in addition to, or instead of, the statistical measures and indicators explicitly listed above. As just one example, the statistical data may comprise correlation data associated with the pressure signal.

At a block 156, the statistical data received at the block 154 may be analyzed to determine if an abnormal situation associated with the agitator exists. For example, the abnormal situation detector 120 and/or the event detector 108 may analyze data received from the statistical parameter generator 104. Other data in addition to the statistical data of the filtered pressure signal received at the block 154 may also be analyzed. For example, statistical data of the unfiltered pressure signal, as well as a raw pressure signal (filtered and/or unfiltered) from which the statistical data was generated could be analyzed. As another example, other data associated with a device that generated the pressure signal could be analyzed (e.g., alerts and/or alarms generated by the device, diagnostics data, etc. As yet another example, data received from other field devices, a controller, a workstation, etc., could be analyzed. For instance, data indicating a current operation of a motor that powers the agitator, data associated with a control signal for controlling the motor, etc., could be analyzed. Further pressure signals generated by additional pressure sensing devices and/or statistical data generated from those pressure signals could be analyzed.

At a block 158, if an abnormal situation has not been detected, the method may end. If, however, an abnormal situation has been detected, the flow may proceed to a block 160. At the block 160, an indicator of the abnormal situation may be generated. The indicator may comprise, for example, an alarm or alert to notify an operator. As another example, the indicator may additionally or alternatively comprise data for affecting a control routine or block.

Several additional example methods for detecting example abnormal situations associated with a stirred vessel agitator are provided below. Although these methods are discussed with reference to FIG. 5, it is to be understood that these methods or similar methods could be implemented by a system different than the subsystem 100.

Figure 12:
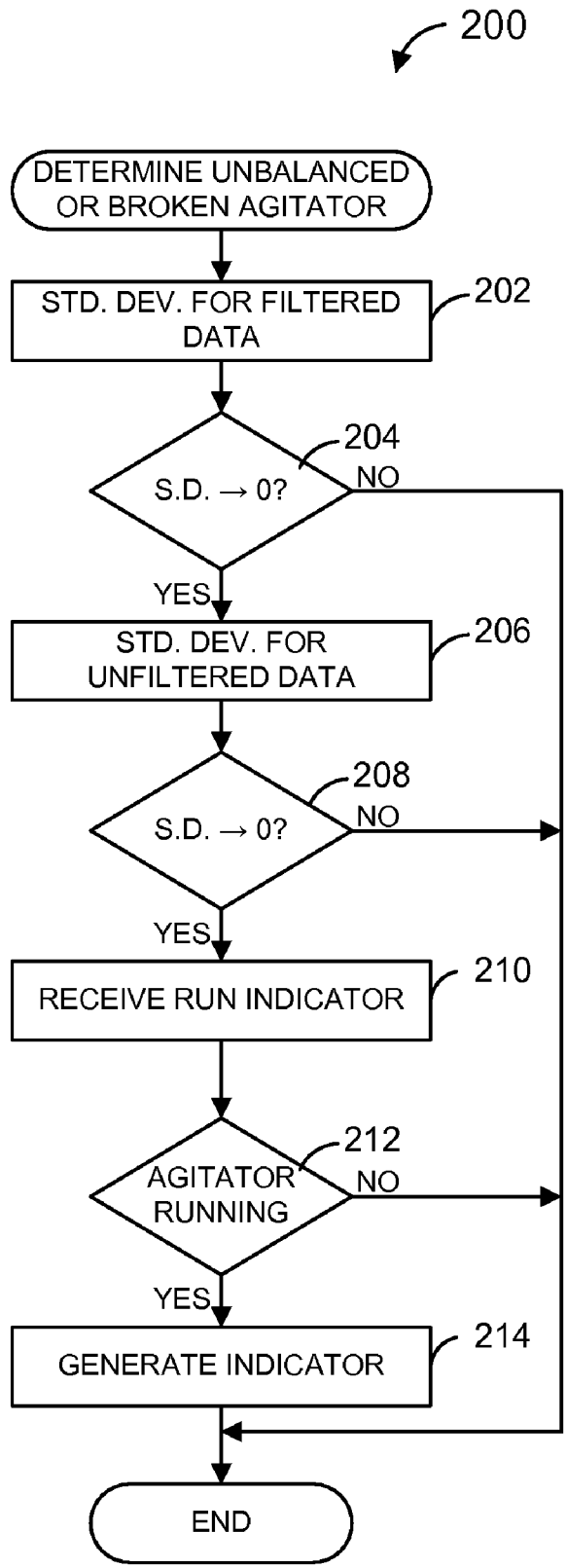
FIG. 12 is a flow diagram of an example method for detecting that an agitator of a stirred vessel is unbalanced and/or broken.

FIG. 12 is a flow diagram of an example method 200 that may be implemented by the subsystem 100 of FIG. 5 to detect that the agitator is unbalanced or broken. At a block 202, the standard deviation associated with filtered pressure sensed within a stirred vessel is received. With respect to the example subsystem 100 of FIG. 5, the abnormal situation detector 120 may receive the standard deviation from the statistical parameter generator 104a and/or indications of events from the event detector 108, or the event detector 108 may receive the standard deviation from the statistical parameter generator 104a.

At a block 204, if the standard deviation of the filtered pressure signal is at or approaching zero, for example, as described above with the unbalanced or broken agitator event, the flow may proceed to block 206. If not, the method may end. At the block 206, the standard deviation associated with unfiltered pressure sensed within a stirred vessel is received. With respect to the example subsystem 100 of FIG. 5, the abnormal situation detector 120 may receive the standard deviation from the statistical parameter generator 104b and/or indications of events from the event detector 108, or the event detector 108 may receive the standard deviation from the statistical parameter generator 104b. At a block 208, if the standard deviation of the unfiltered pressure signal is at or approaching zero, the flow may proceed to a block 210. Otherwise, the method may end.

At the block 210, a run indicator, such as a motor set point or motor signal, is received. With respect to FIG. 2 and the example subsystem 100 of FIG. 5, the abnormal situation detector 120 may receive the run indicator from the motor control element 80 and/or the motor sensor 82 and/or the controller 52, for example. The run indicator may be received to differentiate between a stopped agitator event and the unbalanced/broken agitator event by determining at a block 212 whether the run indicator indicates the agitator is running (e.g., whether the motor is running). If not, the method may end. Otherwise, at the block 214 an indicator for the unbalanced or broken agitator event may be generated. The indicator may comprise, for example, an alarm or alert of the unbalanced or broken agitator event to notify an operator, or the indicator may additionally or alternatively comprise data for affecting a control routine or block.

Figure 13:
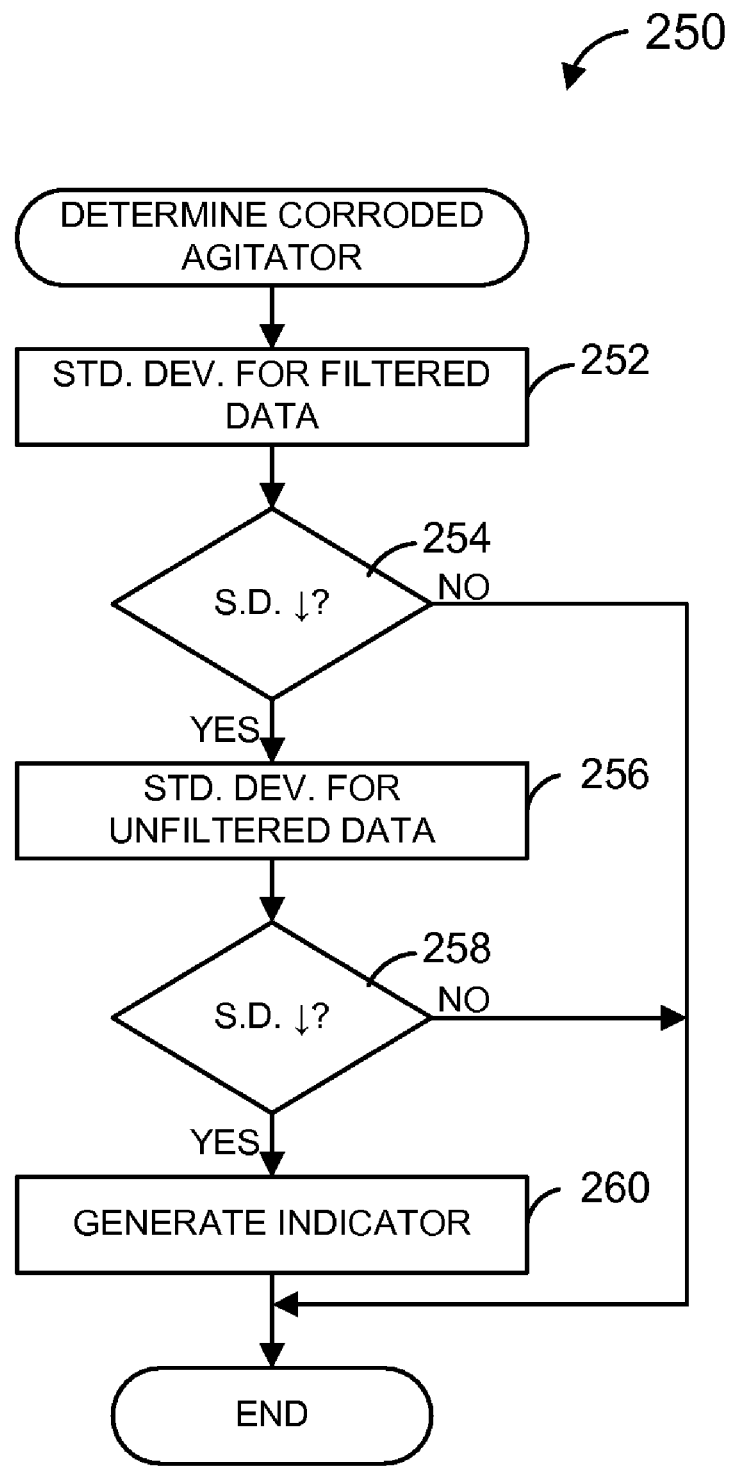
FIG. 13 is a flow diagram of an example method for detecting that an agitator is corroded.

FIG. 13 is a flow diagram of an example method 250 that may be implemented by the subsystem 100 of FIG. 5 to detect that the agitator is severely corroded. At a block 252, the standard deviation associated with filtered pressure sensed within a stirred vessel is received. With respect to the example subsystem 100 of FIG. 5, the abnormal situation detector 120 may receive the standard deviation from the statistical parameter generator 104a and/or indications of events from the event detector 108, or the event detector 108 may receive the standard deviation from the statistical parameter generator 104a.

At a block 254, if the standard deviation of the filtered pressure signal is decreasing, for example, as described above with the corroded agitator event, the flow may proceed to block 256. If not, the method may end. At the block 256, the standard deviation associated with unfiltered pressure sensed within a stirred vessel is received. With respect to the example subsystem 100 of FIG. 5, the abnormal situation detector 120 may receive the standard deviation from the statistical parameter generator 104b and/or indications of events from the event detector 108, or the event detector 108 may receive the standard deviation from the statistical parameter generator 104b.

The standard deviation of the unfiltered pressure signal may be received to differentiate between a corroded agitator event and a missing blade event, multiple missing blades event or massive failure event by determining at a block 258 whether the standard deviation of the unfiltered pressure signal has decreased. At the block 258, if the standard deviation of the unfiltered pressure signal is decreasing, the flow may proceed to a block 260. Otherwise, the method may end. At the block 260 an indicator for the corroded agitator event may be generated. The indicator may comprise, for example, an alarm or alert of the corroded agitator event to notify an operator, or the indicator may additionally or alternatively comprise data for affecting a control routine or block.

Figure 14:
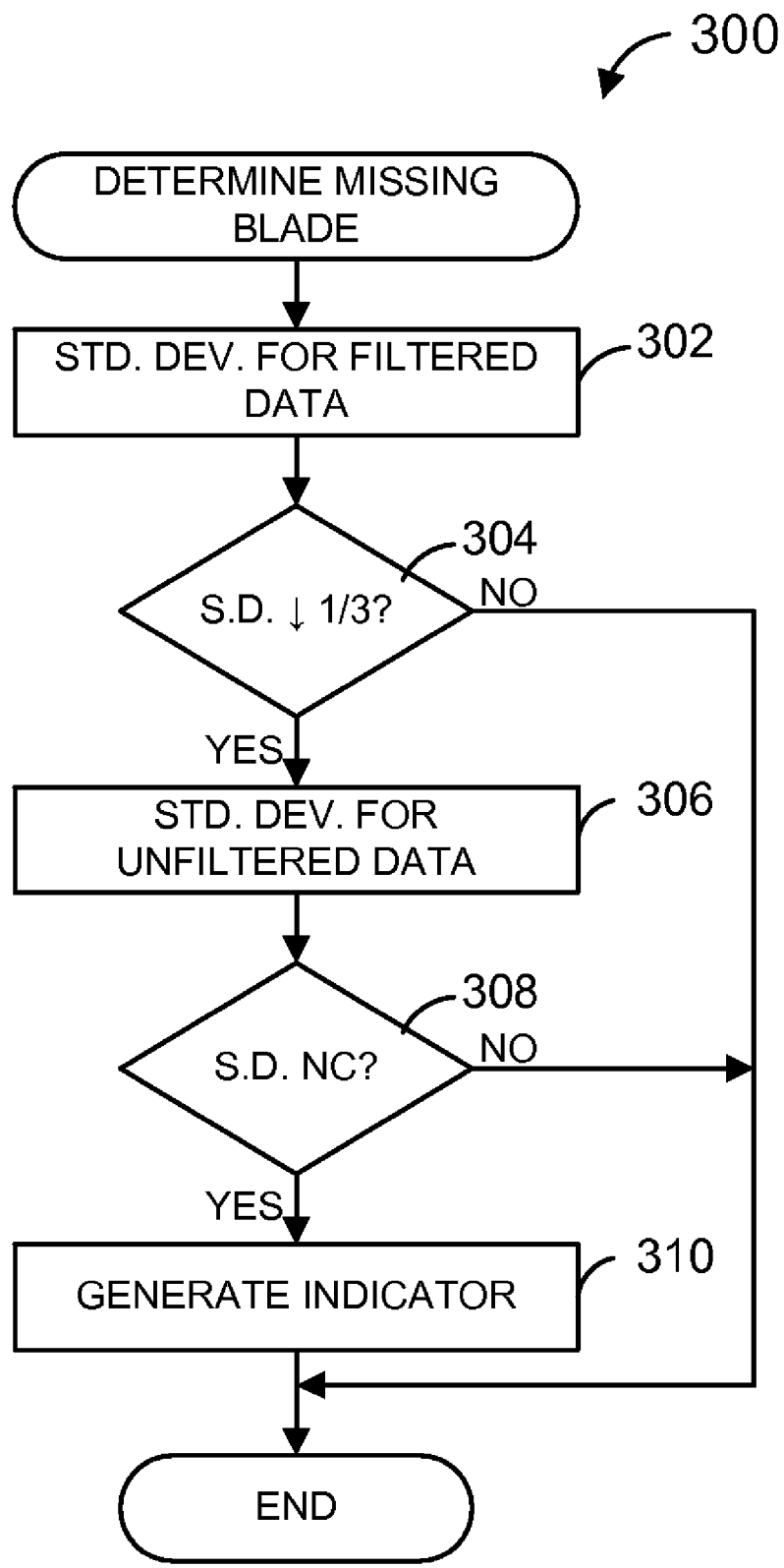
FIG. 14 is a flow diagram of another example method for detecting that the agitator is missing a blade.

FIG. 14 is a flow diagram of an example method 300 that may be implemented by the subsystem 100 of FIG. 5 to detect that the agitator is missing a blade. At a block 302, the standard deviation associated with filtered pressure sensed within a stirred vessel is received. With respect to the example subsystem 100 of FIG. 5, the abnormal situation detector 120 may receive the standard deviation from the statistical parameter generator 104*a* and/or indications of events from the event detector 108, or the event detector 108 may receive the standard deviation from the statistical parameter generator 104*a*.

At a block 304, if the standard deviation of the filtered pressure signal has decreased by one-third (in the case of a three blade agitator), for example, as described above with the missing blade event, the flow may proceed to block 306. If not, the method may end. At the block 306, the standard deviation associated with unfiltered pressure sensed within a stirred vessel is received. With respect to the example subsystem 100 of FIG. 5, the abnormal situation detector 120 may receive the standard deviation from the statistical parameter generator 104*b* and/or indications of events from the event detector 108, or the event detector 108 may receive the standard deviation from the statistical parameter generator 104*b*.

The standard deviation of the unfiltered pressure signal may be received to differentiate between a corroded agitator event and a missing blade event by determining at a block 308 whether the standard deviation of the unfiltered pressure signal has not changed. If not, the method may end. Otherwise, at the block 310 an indicator for the missing blade event may be generated. The indicator may comprise, for example, an alarm or alert of the missing blade event to notify an operator, or the indicator may additionally or alternatively comprise data for affecting a control routine or block.

Figure 15:
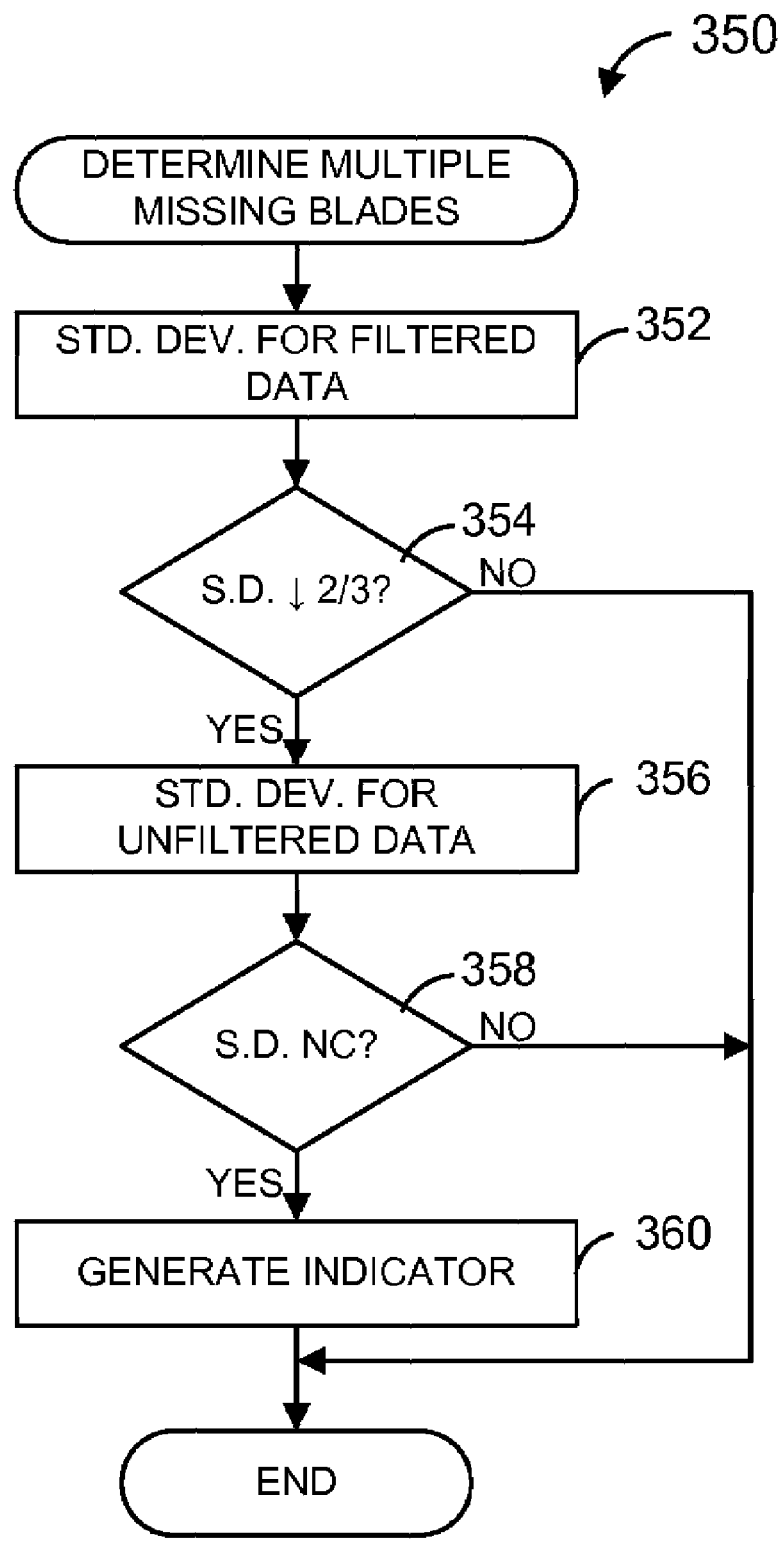
FIG. 15 is a flow diagram of an example method for detecting that the agitator is missing multiple blades.

FIG. 15 is a flow diagram of an example method 350 that may be implemented by the subsystem 100 of FIG. 5 to detect that the agitator is missing multiple blades (2 blades in this example). At a block 352, the standard deviation associated with filtered pressure sensed within a stirred vessel is received. With respect to the example subsystem 100 of FIG. 5, the abnormal situation detector 120 may receive the standard deviation from the statistical parameter generator 104*a* and/or indications of events from the event detector 108, or the event detector 108 may receive the standard deviation from the statistical parameter generator 104*a*.

At a block 354, if the standard deviation of the filtered pressure signal has decreased by two-thirds (in the case of a three blade agitator), for example, as described above with the multiple missing blades event, the flow may proceed to block 356. If not, the method may end. At the block 356, the standard deviation associated with unfiltered pressure sensed within a stirred vessel is received. With respect to the example subsystem 100 of FIG. 5, the abnormal situation detector 120 may receive the standard deviation from the statistical parameter generator 104*b* and/or indications of events from the event detector 108, or the event detector 108 may receive the standard deviation from the statistical parameter generator 104*b*.

The standard deviation of the unfiltered pressure signal may be received to differentiate between a corroded agitator event and a multiple missing blades event by determining at a block 358 whether the standard deviation of the unfiltered pressure signal has not changed. If not, the method may end. Otherwise, at the block 360 an indicator for the multiple missing blades event may be generated. The indicator may comprise, for example, an alarm or alert of the multiple missing blades event to notify an operator, or the indicator may additionally or alternatively comprise data for affecting a control routine or block.

Figure 16:
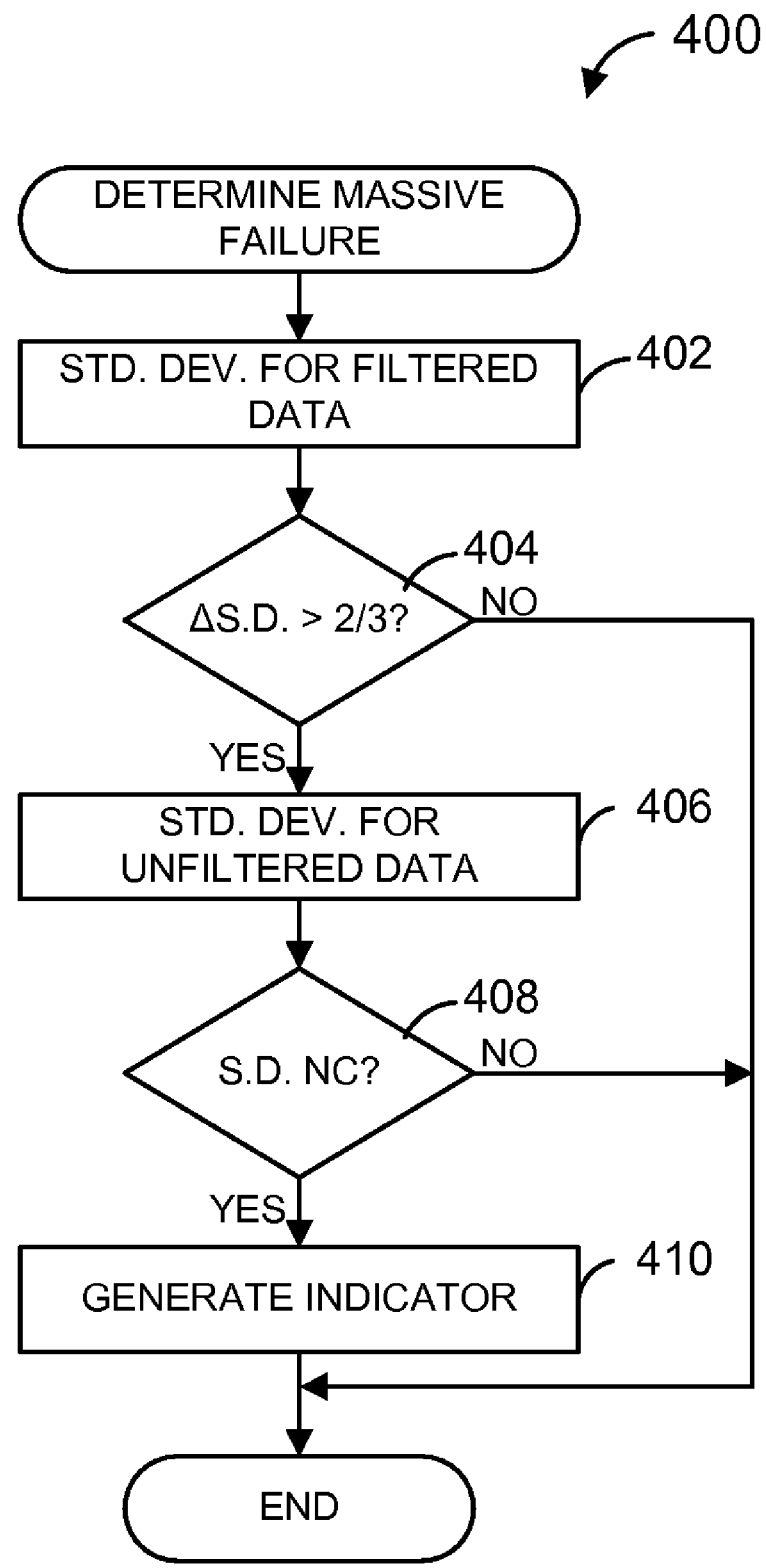
FIG. 16 is a flow diagram of an example method for detecting that the stirred vessel has experienced a massive failure.

FIG. 16 is a flow diagram of an example method 400 that may be implemented by the subsystem 100 of FIG. 5 to detect that the agitator has experienced a massive failure. At a block 402, the standard deviation associated with filtered pressure sensed within a stirred vessel is received. With respect to the example subsystem 100 of FIG. 5, the abnormal situation detector 120 may receive the standard deviation from the statistical parameter generator 104*a* and/or indications of events from the event detector 108, or the event detector 108 may receive the standard deviation from the statistical parameter generator 104*a*.

At a block 404, if the standard deviation of the filtered pressure signal has decreased significantly, such as a change in the standard deviation by more than a threshold amount (e.g., more than 75%), for example, as described above with the massive failure event, the flow may proceed to block 406. If not, the method may end. At the block 406, the standard deviation associated with unfiltered pressure sensed within a stirred vessel is received. With respect to the example subsystem 100 of FIG. 5, the abnormal situation detector 120 may receive the standard deviation from the statistical parameter generator 104*b* and/or indications of events from the event detector 108, or the event detector 108 may receive the standard deviation from the statistical parameter generator 104*b*.

The standard deviation of the unfiltered pressure signal may be received to differentiate between a corroded agitator event and a massive failure event by determining at a block 408 whether the standard deviation of the unfiltered pressure signal has not changed. If not, the method may end. Otherwise, at the block 410 an indicator for the massive failure event may be generated. The indicator may comprise, for example, an alarm or alert of the massive failure event to notify an operator, or the indicator may additionally or alternatively comprise data for affecting a control routine or block.

Figure 17:
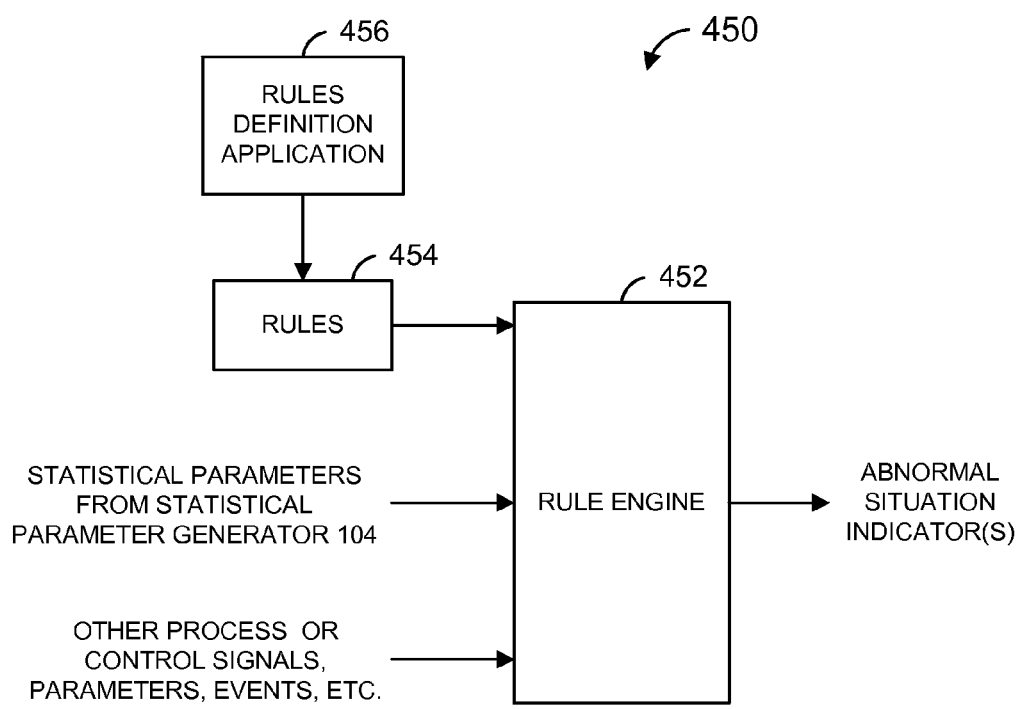
FIG. 17 is a block diagram of an example rules-based system that may implement some or all of the subsystem of FIG. 3.

Referring again to FIG. 5, the event detector 108 and/or the abnormal situation detector 120 may be implemented via a rules-based expert engine, for example. FIG. 17 is a block diagram of an example rules system 450 to implement the event detector 108 and/or the abnormal situation detector 120, or portions of the event detector 108 and/or the abnormal situation detector 120.

The rules system 450 may include a rules engine 452, which may be any type of rules based expert engine and a set of rules 454 which may be stored in a database (such as within a memory of the device 90, a memory of the controller 52, a memory of the workstation 54, etc.) accessible by the rules engine 452. The rules engine 452 analyzes statistical parameters generated by the statistical parameter generators 104*a*, 104*b*, which as discussed previously, may comprise one or more SPM blocks.

The rules engine 452 may also analyze other data such as the pressure signal generated by the pressure sensing device 90, other process or control signals, statistical parameters, event indicators, alerts, alarms, diagnostic data, etc., generated by other devices in the process plant. As one example, the rules engine 452 may analyze statistical parameters and/or statistical events generated by the motor control element 80 and/or the motor sensor 82. As another example, the rules engine 452 may analyze statistical parameters or other types of data from additional pressure sensor devices or other devices.

The rules engine 452 applies the rules 454 to the statistical parameters and, optionally, other data to determine if an abnormal situation exists that indicates, according to at least one of the rules 454, that an alert or alarm should sent to a user, for example. Of course, if desired, the rules engine 452 may take other actions, besides providing or setting an alarm, if a rule indicates that a problem exists. Such actions may include, for example, shutting down or more components of the process, switching control parameters to alter the control of the process, etc.

Optionally, a rules development application or routine 456 may enable a user to develop one or more expert system rules (e.g., to be used as one of the rules 454) based on statistical data patterns and their correlations, to thereby detect abnormal situations associated with the agitator 70. Thus, while at least some of the rules 454 used by the rules engine 452 may be preset or preconfigured, the rules development application 456 enables a user to create other rules based on experiences within the process plant being monitored. For example, if a user knows that a certain combination of SPM parameter conditions or events indicates a certain problem with the agitator 70, the user can use the rules development application 456 to create an appropriate rule to detect this condition and/or, if desired, to generate an alarm or alert or to take some other action based on the detected existence of this condition. U.S. patent application Ser. No. 10/971,361, filed Oct. 22, 2004, and entitled "ABNORMAL SITUATION PREVENTION IN A PROCESS PLANT", now U.S. Pat. No. 7,079,984, describes example rules development applications and configuration screens that may be used to create rules for detecting abnormal situations and/or, if desired, for generating alarms, alerts, or for taking some other action based on the detected existence of abnormal situations. Similar or different rules development applications may be used as well to develop the rules 454. U.S. Provisional Patent Application No. 60/549,796 is hereby incorporated by reference herein in its entirety for all purposes.

Of course, during operation of the process plant, the rules engine 452, which may be configured to receive the SPM data, for example, (and any other needed data), applies the rules 454 to determine if any of the rules are matched. If an abnormal situation associated with the agitator 70 is detected based on one or more of the rules 454, an alert can be displayed to a plant operator, or sent to another appropriate person, or some other action may be taken.

The rules engine 452 may be implemented, at least partially, by the pressure sensing device 90. Additionally or alternatively, the rules engine 452 may be implemented, at least partially, by some other device such as one or more other pressure sensing devices, one or more other field devices, the controller 52, the workstation 54, etc. If the rules engine 452 is implemented, at least partially, by some device other than the pressure sensing device 90, the rules engine 452 may be, at least partially, a client system the statistical parameters Additionally, some of the data that may be used by the rules engine 452 are SPM conditions that may be detected within the devices in which the SPM data is generated. In this case, the rules engine 452 may be a client system or may be part of a client system that reads the SPM parameters and conditions from the device 90 via, for example, the communication server 96, the controller 52, etc.

Figure 6:
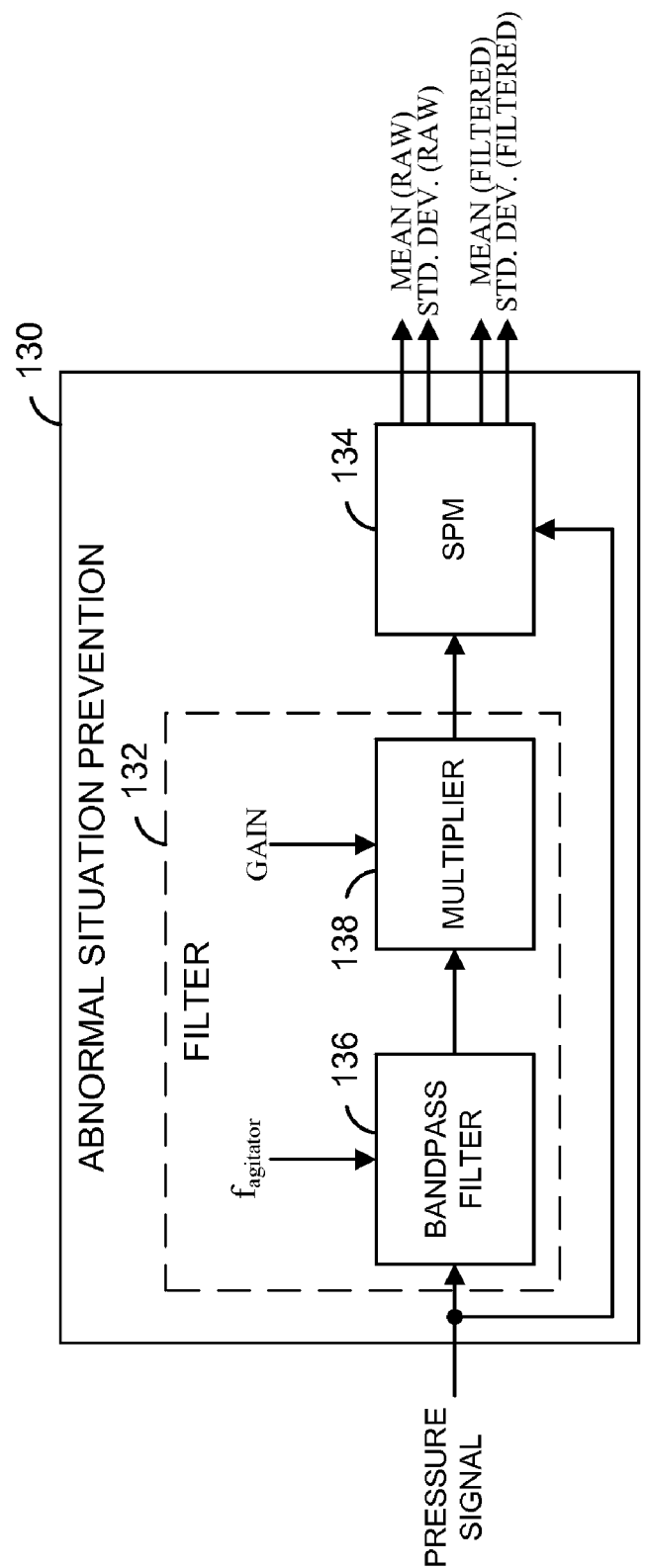
FIG. 6 is a block diagram of an example abnormal situation prevention block including a digital filter that may be used in the subsystem of FIG. 5.
Figure 18A:
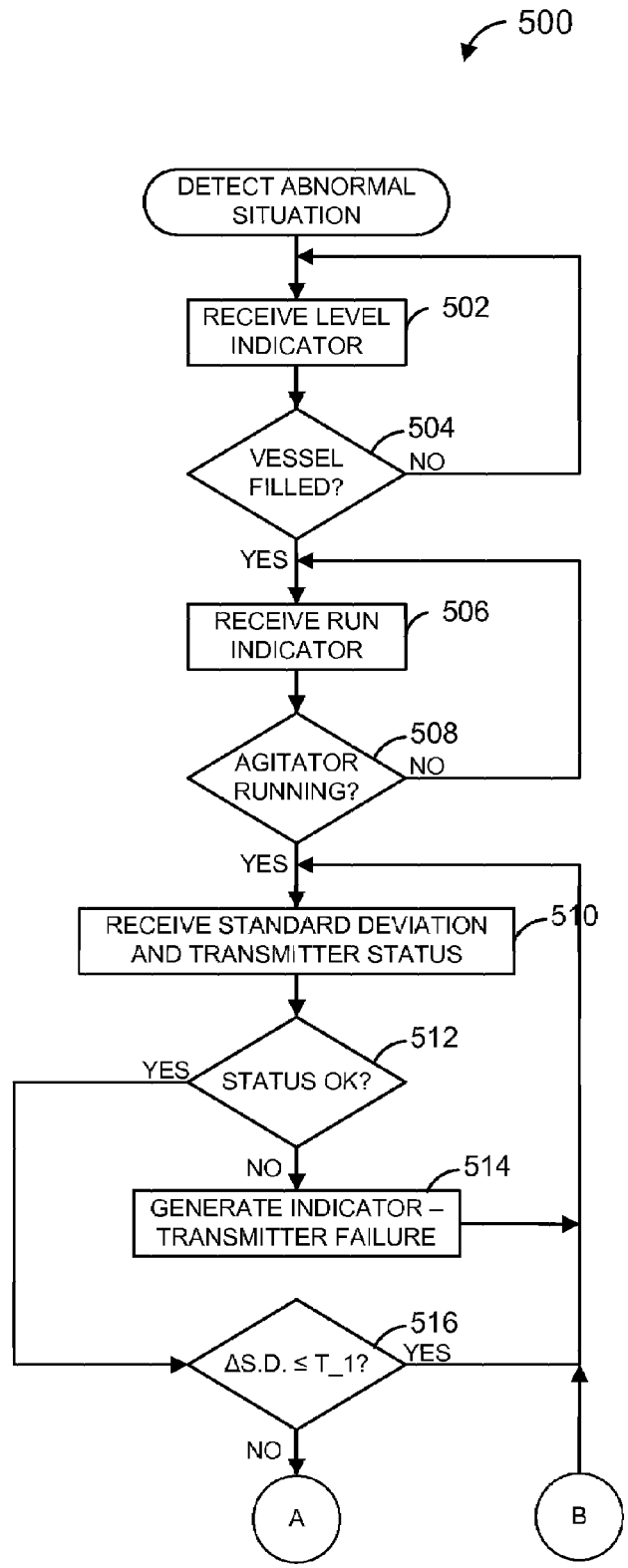
FIGS. 18A and 18B is a flow diagram of another example method for detecting an abnormal situation associated with an agitator of a stirred vessel in a process plant.
Figure 18B:
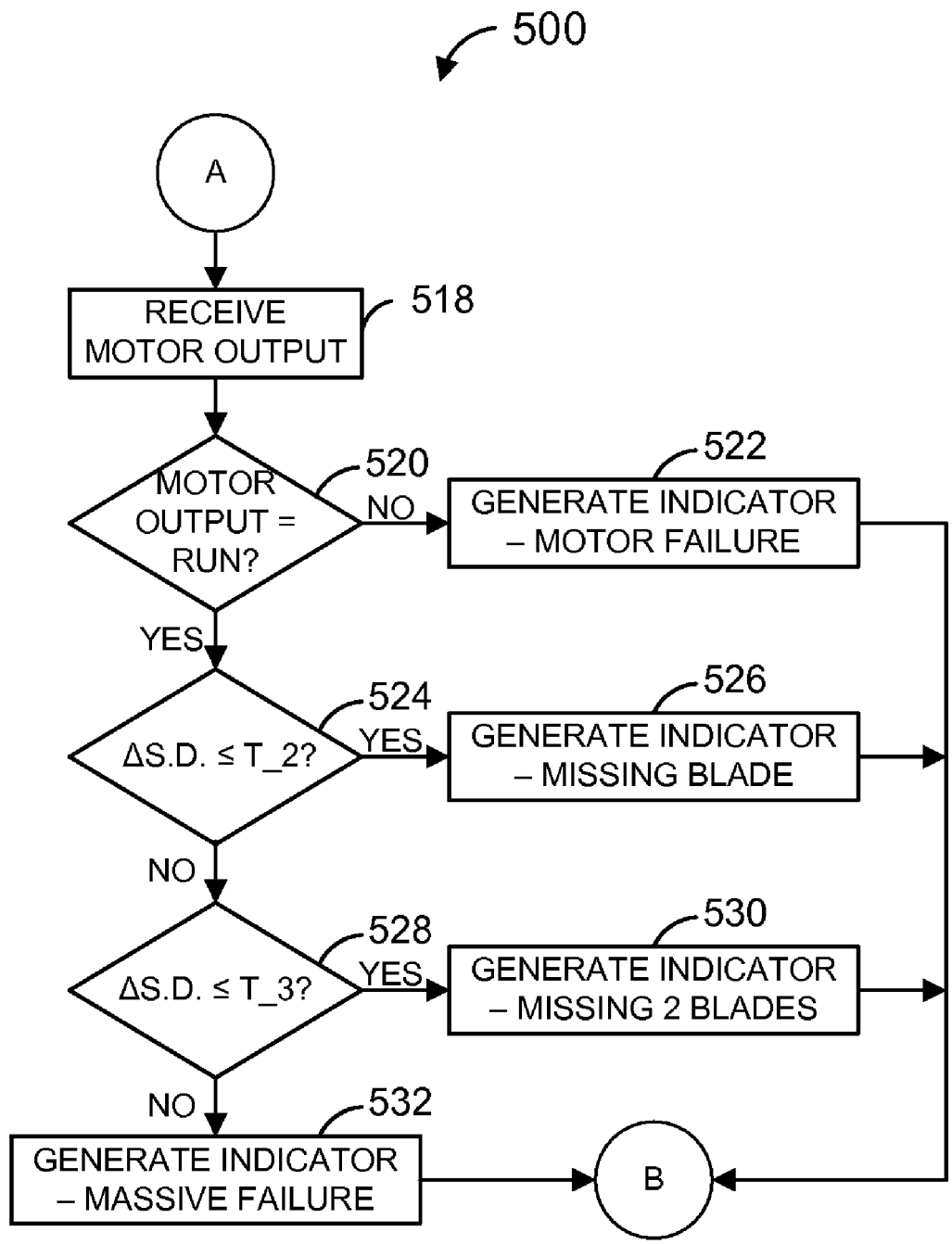

FIGS. 18A and 18B is a flow chart of the abnormal situation detection routine that can be implemented as part of an agitation loss detection in the abnormal situation prevention module of FIG. 6. Beginning at a block 502, the method receives an indicator that indicates the level of material in the stirred vessel. For example, a process variable from a device may be received, such as a pressure signal from the sensing device 90. As seen in FIG. 2, the sensing device 90 may be placed at least partially within the stirred vessel 60 at a position corresponding to the full level. Generally, if material is in the stirred vessel 60 at the full level, the sensing device 90 will sense the pressure associated with the material thereby indicating the stirred vessel is full. At a block 504, the method checks to make sure that the vessel is full based on the level indicator received at the block 502. If the stirred vessel is not full, the method may continue to receive and check for a full level indicator.

If the vessel is full, a run indicator is received at a block 506 that indicates whether the agitator is running or not. For example, a process variable from a device, such as a signal from the motor control element 80 and/or the motor sensor 82 or a set point from the controller 52, may be received. At a block 508, the method checks to make sure that the motor is running based on the run indicator received at the block 506. If the motor is not running, the method may continue to receive and check for a run indicator.

If the stirred vessel is both full and running, at a block 510 the standard deviation of the filtered pressure signal and the sensing device status may be received. The status may be provided as a process variable such as a set point from the controller 52, as a quality check of the pressure signal (e.g., pressure status), as the result of a diagnostics check by the controller 60, or the result of a diagnostics check by the sensing device 90 itself. If the status of the sensing device 90 is not okay, an indicator may be generated at a block 514 that indicates an abnormal condition with the sensing device 90 (e.g., transmitter failure) and a notification of a bad measurement. If the status of the sensing device 90 (e.g., a transmitter), is indicated as "OK", the method may proceed to analyze the standard deviation at a block 516, which, in the example provided, is an analysis of the change in the standard deviation.

At the block 516, the method analyzes the change in the filtered standard deviation from its initial value or from its nominal value. If the change is less than a threshold value T_1 (e.g. 25% in the case of a 3-bladed agitator), which may be determined by a sensitivity parameter, then the block 516 determines the status of the agitator is normal, and control is returned to the block 510. However, if the change is greater than the threshold T_1, then there exists some form of abnormal condition, which may subsequently be determined.

At a block 518, if an abnormal condition is detected at block 516, the method receives a process variable associated with the motor 76, such as a signal from the motor control element 80 and/or motor sensor 82 which may indicate the motor is running and operating properly. If the motor is not running or not running properly, an indication of motor failure may be generated at block 522. In one implementation, the run indicator received at the block 506 may be received from the controller 52 (e.g., a set point) and the motor output signal received at the block 518 may be received from the motor control element 80 and/or the motor sensor 82, such that the controller signal indicates the motor should be running whereas the motor sensor signal indicates that the motor is not actually running.

If the motor output indicates it is operating normally, at a block 524 the change in standard deviation of the filtered pressure signal may be compared to a second threshold T_2, which may be set as twice the threshold of T_1 (e.g., 50%).

If the change in standard deviation is less than (or equal to) the threshold T_2, then the abnormal condition may be determined as a missing blade event. A missing blade event indication may be generated at block 526.

If the change in standard deviation is greater than the second threshold T_2, at a block 528 the change in standard deviation of the filtered pressure signal may be compared to a third threshold T_3, which may be set as three times the threshold of T_1 (e.g., 75%). If the change in standard deviation is less than (or equal to) the threshold T_3, then the abnormal condition may be determined as a multiple missing blades event. A multiple missing blades event indication may be generated at block 530. If the change in standard deviation is greater than the threshold T_3, then a massive agitator failure is detected at a block 532.

Some or all of the blocks of FIGS. 5, 6 and 17 may be implemented in whole or in part using software, firmware, or hardware. Similarly, the example methods described with respect to FIGS. 11-16, 18A and 18B may be implemented in whole or in part using software, firmware, or hardware. If implemented, at least in part, using a software program, the program may be configured for execution by a processor and may be embodied in software instructions stored on a tangible medium such as CD-ROM, a floppy disk, a hard drive, a digital versatile disk (DVD), or a memory associated with the processor, but persons of ordinary skill in the art will readily appreciate that the entire program or parts thereof could alternatively be executed by a device other than a processor, and/or embodied in firmware and/or dedicated hardware in a well known manner. For example, any or all of statistical parameter generators 104a, 104b, the event detector 108, the abnormal situation detector 120, and the rules engine 452 could be implemented by software, hardware, and/or firmware. Further, although the example methods have been described with reference to FIGS. 11-16, 18A and 18B, persons of ordinary skill in the art will readily appreciate that many other methods of implementing the example subsystem 100 of FIG. 5 may alternatively be used. For example, the order of execution of the blocks may be changed, and/or the blocks may be changed, eliminated, or combined.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for detecting an abnormal situation associated with a stirred vessel in a process plant, the method comprising:
   collecting first data associated with pressure within a stirred vessel;
   filtering the collected first data to isolate a frequency component corresponding to changes in pressure associated with blade rotation in the vessel;
   multiplying the filtered first data by a fixed gain factor;
   generating statistical data from the filtered and multiplied first data;
   analyzing the statistical data to detect whether one or more abnormal situations associated with an agitator of the stirred vessel exist; and
   generating an indicator of an abnormal situation if one or more of the one or more abnormal situations are detected.

2. A method as defined in claim 1, wherein filtering the collected first data to isolate a frequency component corresponding to changes in pressure associated with blade rotation in the vessel comprises filtering the collected first data to isolate a frequency component corresponding to a rate at which spikes occurs in the pressure signal generated by a pressure sensor disposed at least partially within a vessel of the agitator.

3. A method as defined in claim 1, wherein generating statistical data from the filtered first data comprises generating a standard deviation of a pressure signal generated by a pressure sensor disposed at least partially within a vessel of the agitator.

4. A method as defined in claim 1, further comprising:
   collecting second data associated with a normal pressure within the stirred vessel; and
   generating nominal statistical data from the collected second data, wherein the nominal statistical data represents an indication of a normal operation of the vessel;
   wherein analyzing the statistical data to detect whether one or more abnormal situations associated with an agitator of the stirred vessel exist comprises comparing the statistical data to the nominal statistical data to detect whether one or more abnormal situations associated with the agitator of the stirred vessel exist.

5. A method as defined in claim 1, wherein analyzing the statistical data comprises determining if a standard deviation of the filtered first data is approaching zero or is at least approximately zero to detect whether the agitator has stopped turning.

6. A method as defined in claim 1, wherein analyzing the statistical data comprises determining if a standard deviation of the filtered first data has significantly deviated to detect corrosion of the agitator.

7. A method as defined in claim 1, wherein analyzing the statistical data comprises determining if a standard deviation of the filtered first data has deviated by a first threshold to detect a missing blade from the agitator.

8. A method as defined in claim 7, wherein analyzing the statistical data comprises determining if a standard deviation of the filtered first data has deviated by a second threshold to detect multiple missing blades from the agitator.

9. A method as defined in claim 8, wherein analyzing the statistical data comprises determining if a standard deviation of the filtered first data has deviated by a third threshold to detect massive agitator failure.

10. A method as defined in claim 1, wherein collecting first data associated with pressure within a stirred vessel comprises collecting the first data based on a pressure signal generated by a pressure sensor disposed at least partially within the stirred vessel.

11. A method for detecting an abnormal situation associated with a stirred vessel in a process plant, the method comprising:
    collecting first data associated with pressure within a stirred vessel
    filtering the collected first data to isolate a frequency component corresponding to changes in pressure associated with blade rotation in the vessel;
    multiplying the filtered first data by a fixed gain factor;
    generating first statistical data from the filtered and multiplied first data;
    generating second statistical data from the collected first data; and
    analyzing the first statistical data and the second statistical data to detect whether one or more abnormal situations associated with an agitator of the stirred vessel exist; and generating an indicator of an abnormal situation if one or more of the one or more abnormal situations are detected.

12. A method as defined in claim 11, wherein analyzing the first statistical data and the second statistical data to detect whether one or more abnormal situations associated with the agitator of the stirred vessel exist comprises analyzing the first statistical data and the second statistical data to determine whether both a standard deviation of the filtered first data and a standard deviation of the collected first data have significantly deviated to detect corrosion of the agitator.

13. A method as defined in claim 11, wherein analyzing the first statistical data and the second statistical data to detect whether one or more abnormal situations associated with the agitator of the stirred vessel exist comprises analyzing the first statistical data and the second statistical data determine whether a standard deviation of the filtered first data has deviated by a first threshold and whether a standard deviation of the collected first data has no significant deviation to detect a missing blade from the agitator.

14. A method as defined in claim 13, wherein analyzing the first statistical data and the second statistical data to detect whether one or more abnormal situations associated with the agitator of the stirred vessel exist comprises analyzing the first statistical data and the second statistical data determine whether a standard deviation of the filtered first data has deviated by a second threshold and whether a standard deviation of the collected first data has no significant deviation to detect multiple missing blades from the agitator.

15. A method as defined in claim 14, wherein the first statistical data and the second statistical data to detect whether one or more abnormal situations associated with the agitator of the stirred vessel exist comprises analyzing the first statistical data and the second statistical data determine whether a standard deviation of the filtered first data has deviated by a third threshold and whether a standard deviation of the collected first data has no significant deviation to detect massive agitator failure.

16. A method as defined in claim 11, further comprising:
    collecting second data associated with a normal pressure within the stirred vessel;
    filtering the collected second data to isolate the frequency component corresponding to changes in pressure associated with blade rotation in the vessel;
    generating first nominal statistical data from the filtered data, wherein the nominal statistical data represents an indication of a normal operation of the vessel; and
    generating second nominal statistical data from the collected second data;
    wherein analyzing the first statistical data and the second statistical data to detect whether one or more abnormal situations associated with an agitator of the stirred vessel exist comprises respectively comparing the first statistical data to the first nominal statistical data and the second statistical data to the second nominal statistical data to detect whether one or more abnormal situations associated with the agitator of the stirred vessel exist.

17. A system for detecting an abnormal situation associated with a stirred vessel in a process plant, the system comprising:
    a digital bandpass filter tuned to a frequency component corresponding to a rate at which spikes occurs in a pressure signal generated by a pressure sensor disposed at least partially within a stirred vessel;
    a gain multiplier to multiply the filtered pressure signal by a fixed gain factor;
    a statistical parameter generator to generate one or more first statistical parameters based on a filtered and multiplied pressure signal; and
    an abnormal situation detector to detect at least one abnormal situation associated with an agitator of the stirred vessel based on the one or more first statistical parameters, and to generate one or more indicators of one or more abnormal situations situation are detected.

18. A system as defined in claim 17, wherein the digital filter comprises a finite impulse response (FIR) filter.

19. A system as defined in claim 17, wherein the digital filter comprises a digital filter designed by a Parks-McClellan filter design algorithm.

20. A system as defined in claim 17, wherein the digital filter comprises a $16^{th}$ order filter.

21. A pressure transmitter for detecting an abnormal situation associated with a stirred vessel in a process plant, the pressure transmitter comprising:
    a processor;
    a memory;
    a routine stored in the memory and adapted to be executed by the processor to receive data associated with a pressure signal generated by a pressure sensor disposed at least partially within a stirred vessel;
    a routine stored in the memory and adapted to be executed by the processor to filter the received data to isolate a frequency component corresponding to a rate at which spikes occur in the pressure signal;
    a routine stored in the memory and adapted to be executed by the processor to multiply the filtered data by a fixed gain factor;
    a routine stored in the memory and adapted to be executed by the processor to generate statistical data from the filtered and multiplied data, wherein the statistical data comprises an indication of a standard deviation of the pressure signal at the frequency component; and
    a routine stored in the memory and adapted to be executed by the processor to analyze the statistical data to detect whether one or more abnormal situations associated with an agitator of the stirred vessel exist based on changes in the standard deviation of the pressure signal at the frequency component.

22. A pressure transmitter as defined in claim 21, further comprising:
    a routine stored in the memory and adapted to be executed by the processor to determine if the agitator of the stirred vessel is rotating;
    a routine stored in the memory and adapted to be executed by the processor to:
    generate an indication that the agitator has stopped rotating if the routine to analyze the statistical data determines the standard deviation of the filtered data is approaching zero or is at least approximately zero and if the routine to determine if the agitator is rotating determines the agitator is not running,
    generate an indication that the agitator has fallen off or broken if the routine to analyze the statistical data determines the standard deviation of the filtered data is approaching zero or is at least approximately zero and if the routine to determine if the agitator is rotating determines the agitator is running,
    generate an indication that the agitator is corroded if the routine to analyze the statistical data determines the standard deviation of the filtered data has significantly deviated, generate an indication of a missing blade from the agitator if the routine to analyze the statistical data determines the standard deviation of the filtered data has deviated by a first threshold, generate an indication of multiple missing blades from the agitator if the routine to analyze the statistical data determines the standard deviation of the filtered data has deviated by a second threshold greater than the first threshold, and generate an indication of massive agitator failure if the routine to analyze the statistical data determines the standard deviation of the filtered data has deviated by a third threshold greater than the second threshold.

23. A pressure transmitter for detecting an abnormal situation associated with a stirred vessel in a process plant, the pressure transmitter comprising:

a processor;

a memory;

a routine stored in the memory and adapted to be executed by the processor to receive data associated with a pressure signal generated by a pressure sensor disposed at least partially within a stirred vessel;

a routine stored in the memory and adapted to be executed by the processor to filter the received data to isolate a frequency component corresponding to a rate at which spikes occur in the pressure signal;

a routine stored in the memory and adapted to be executed by the processor to multiply the filtered data by a fixed gain factor;

a routine stored in the memory and adapted to be executed by the processor to generate first statistical data from the filtered and multiplied data, wherein the first statistical data comprises an indication of a standard deviation of the pressure signal at the frequency component;

a routine stored in the memory and adapted to be executed by the processor to generate second statistical data from the unfiltered received data, wherein the second statistical data comprises an indication of a standard deviation of the unfiltered pressure signal; and a routine stored in the memory and adapted to be executed by the processor to analyze the first statistical data and the second statistical data to detect whether one or more abnormal situations associated with an agitator of the stirred vessel exist based on changes in one or more of the group consisting of: the standard deviation of the pressure signal at the frequency component and the standard deviation of the unfiltered pressure signal.

24. A pressure transmitter as defined in claim 23, further comprising:

a routine stored in the memory and adapted to be executed by the processor to determine if the agitator of the stirred vessel is rotating;

a routine stored in the memory and adapted to be executed by the processor to:

generate an indication that the agitator has stopped rotating if the routine to analyze the first and second statistical data determines the standard deviation of the filtered data is approaching zero or is at least approximately zero and if the routine to determine if the agitator is rotating determines the agitator is not running, generate an indication that the agitator has fallen off or broken if the routine to analyze the first and second statistical data determines the standard deviation of the filtered data is approaching zero or is at least approximately zero and if the routine to determine if the agitator is rotating determines the agitator is running, generate an indication that the agitator is corroded if the routine to analyze the first and second statistical data determines the standard deviation of the filtered data has significantly deviated and the standard deviation of the unfiltered pressure signal has significantly deviated, generate an indication of a missing blade from the agitator if the routine to analyze the first and second statistical data determines the standard deviation of the filtered data has deviated by a first threshold and the standard deviation of the unfiltered pressure signal has no significant deviation, generate an indication of multiple missing blades from the agitator if the routine to first and second analyze the statistical data determines the standard deviation of the filtered data has deviated by a second threshold greater than the first threshold and the standard deviation of the unfiltered pressure signal has no significant deviation, and generate an indication of massive agitator failure if the routine to first and second analyze the statistical data determines the standard deviation of the filtered data has deviated by a third threshold greater than the second threshold and the standard deviation of the unfiltered pressure signal has no significant deviation.

\* \* \* \* \*

UNITED STATES PATENT AND TRADEMARK OFFICE
CERTIFICATE OF CORRECTION

| | |
|---|---|
| PATENT NO. | : 7,778,797 B2 |
| APPLICATION NO. | : 11/863172 |
| DATED | : August 17, 2010 |
| INVENTOR(S) | : Roger K. Pihlaja et al. |

It is certified that error appears in the above-identified patent and that said Letters Patent is hereby corrected as shown below:

At Column 20, line 44, "event" should be -- events --.

At Column 35, line 63, "occurs" should be -- occur --.

Signed and Sealed this
Twenty-eighth Day of June, 2011

David J. Kappos
*Director of the United States Patent and Trademark Office*